US011254505B2

(12) United States Patent
Sun et al.

(10) Patent No.: US 11,254,505 B2
(45) Date of Patent: Feb. 22, 2022

(54) ROLLER TRACKS WITH REMOVABLE ROLLER SUPPORT BARS, CABLE DIVIDERS AND LIVING HINGES

(71) Applicant: Sungal Corporation, Westport, CT (US)

(72) Inventors: Yeyang Sun, Westport, CT (US); Qing Wei Wang, Shanghai (CN)

(73) Assignee: Sungal Corporation, Westport, CT (US)

( * ) Notice: Subject to any disclaimer, the term of this patent is extended or adjusted under 35 U.S.C. 154(b) by 0 days.

(21) Appl. No.: 16/867,708

(22) Filed: May 6, 2020

(65) Prior Publication Data

US 2020/0369473 A1 Nov. 26, 2020

Related U.S. Application Data

(60) Provisional application No. 62/850,351, filed on May 20, 2019.

(51) Int. Cl.
*B65G 39/18* (2006.01)
*B65G 13/12* (2006.01)
(Continued)

(52) U.S. Cl.
CPC ............. *B65G 9/002* (2013.01); *B65G 13/12* (2013.01); *B65G 39/02* (2013.01); *B65G 39/18* (2013.01); *B65G 2812/0352* (2013.01)

(58) Field of Classification Search
None
See application file for complete search history.

(56) References Cited

U.S. PATENT DOCUMENTS

| 754,817 A | 3/1904 | Schriefer |
| 898,970 A | 9/1908 | Cook |

(Continued)

FOREIGN PATENT DOCUMENTS

| DE | 2336476 | 2/1975 |
| DE | 3030264 | 2/1982 |

(Continued)

OTHER PUBLICATIONS

International Preliminary Report on Patentability dated Feb. 1, 2019 from corresponding International PCTApplication PCT/US2017/057598, 7 pages.

*Primary Examiner* — Kavel Singh
(74) *Attorney, Agent, or Firm* — Ohlandt, Greeley, Ruggiero & Perle, L.L.P.

(57) ABSTRACT

A roller track includes a base, parallel guides, roller support bars placed into their respective guides, and a plurality of rollers removably disposed between the roller support bars. The roller support bars preferably are removably secured to the base via the respective guides which are affixed to the base. The base also can be provided with connecting elements sidewalls thereof such that a plurality of bases of roller tracks can be connected laterally to accommodate any width of shelf or display planogram. Thus, the roller tracks can be used either separately roller tracks or as a continuous mat (i.e. a plurality of roller tracks affixed to adjacent roller tracks). Additionally, dividers can be removably affixed to each roller track via securing members comprising an upper body portion formed via a living hinge and at least one lower connector that removably connects the securing member to the roller track.

17 Claims, 17 Drawing Sheets

(51) Int. Cl.
*B65G 39/02* (2006.01)
*B65G 9/00* (2006.01)

(56) References Cited

U.S. PATENT DOCUMENTS

| | | | |
|---|---|---|---|
| 1,366,743 A | 1/1921 | O'Connor | |
| 1,577,066 A | 3/1926 | Medart et al. | |
| 3,039,621 A | 6/1962 | Pilcher | |
| 3,111,915 A | 11/1963 | Gray | |
| 3,120,199 A | 2/1964 | Kolster et al. | |
| 3,232,442 A | 2/1966 | Wilson | |
| 3,304,893 A | 2/1967 | Stromquist | |
| 3,343,506 A | 9/1967 | Buchbinder et al. | |
| 3,487,951 A | 1/1970 | Beltzung | |
| 3,499,539 A | 3/1970 | Fisher | |
| 3,705,654 A | 12/1972 | Barrineau | |
| 4,231,301 A | 11/1980 | Barrineau, III | |
| 4,240,764 A | 12/1980 | Wegner | |
| 4,250,815 A | 2/1981 | Swanson | |
| 4,292,902 A | 10/1981 | Barrineau | |
| 4,391,378 A | 7/1983 | Secon | |
| 4,405,052 A | 9/1983 | Spiros | |
| 4,531,646 A | 7/1985 | Howard | |
| 4,627,542 A | 12/1986 | Fredrickson | |
| 4,684,094 A | 8/1987 | Everett | |
| 4,785,945 A | 11/1988 | Rowse et al. | |
| 5,094,350 A | 3/1992 | Smock | |
| 5,251,973 A | 10/1993 | Hazan | |
| 5,415,302 A | 5/1995 | Carlson et al. | |
| 5,450,971 A | 9/1995 | Boron et al. | |
| 5,487,474 A | 1/1996 | Heimendinger | |
| 5,607,068 A | 3/1997 | Coretti, Jr. et al. | |
| 5,622,415 A | 4/1997 | Felsenthal et al. | |
| 5,641,083 A | 6/1997 | Metcalf | |
| 5,797,502 A | 8/1998 | Brady et al. | |
| 5,951,228 A | 9/1999 | Pfeiffer et al. | |
| 6,302,036 B1 | 10/2001 | Carson et al. | |
| 6,526,897 B1 | 3/2003 | Ondrasik | |
| 6,729,484 B2 | 5/2004 | Sparkowski | |
| 6,814,245 B2 | 11/2004 | Leclerc et al. | |
| 6,817,478 B2 | 11/2004 | Venegas, Jr. | |
| 6,871,747 B2 | 3/2005 | Bustos | |
| 6,920,831 B2 | 7/2005 | Lin | |
| 6,971,528 B2 | 12/2005 | Chen | |
| 7,014,030 B2 * | 3/2006 | Hendzel | F16M 1/00 193/2 R |
| 7,124,897 B2 | 10/2006 | Bustos | |
| 7,128,221 B2 | 10/2006 | Metcalf | |
| 7,246,711 B1 | 7/2007 | Metcalf | |
| 7,497,342 B2 | 3/2009 | Hardy | |
| 7,533,948 B2 | 5/2009 | Smith et al. | |
| 7,628,282 B2 | 12/2009 | Hardy | |
| 8,020,714 B2 | 9/2011 | Miller, Jr. et al. | |
| 8,047,385 B2 * | 11/2011 | Hardy | A47F 1/12 211/59.3 |
| 8,196,761 B2 | 6/2012 | Morandi | |
| 8,312,199 B2 | 11/2012 | Johnson | |
| 8,376,154 B2 | 2/2013 | Sun | |
| 9,004,300 B1 | 4/2015 | Morrell | |
| 9,016,483 B2 | 4/2015 | Howley | |
| 9,215,926 B1 | 12/2015 | Offerman | |
| 9,247,834 B1 | 2/2016 | Lucht et al. | |
| 9,357,840 B2 | 6/2016 | Davis | |
| 9,713,393 B2 * | 7/2017 | Hardy | A47F 5/005 |
| 9,878,649 B2 | 1/2018 | Beere | |
| 9,936,825 B1 | 4/2018 | Lindblom et al. | |
| 10,165,854 B2 | 1/2019 | Lim et al. | |
| 10,299,588 B1 | 5/2019 | Lai et al. | |
| 2004/0178156 A1 | 9/2004 | Knorring et al. | |
| 2004/0251226 A1 | 12/2004 | Yang | |
| 2005/0127802 A1 | 6/2005 | Chen | |
| 2007/0110511 A1 | 5/2007 | Chen | |
| 2007/0187344 A1 | 8/2007 | Mueller et al. | |
| 2007/0295681 A1 | 12/2007 | Colin | |
| 2008/0142463 A1 | 6/2008 | Johnson | |
| 2018/0110345 A1 | 4/2018 | Sun | |

FOREIGN PATENT DOCUMENTS

| | | |
|---|---|---|
| DE | 29712455 | 9/1997 |
| DE | 19625476 | 1/1998 |
| DE | 202018105681 | 10/2018 |
| FR | 3002838 | 12/2015 |
| GB | 766411 | 1/1957 |
| GB | 816356 | 7/1959 |
| GB | 1180043 | 2/1970 |

* cited by examiner

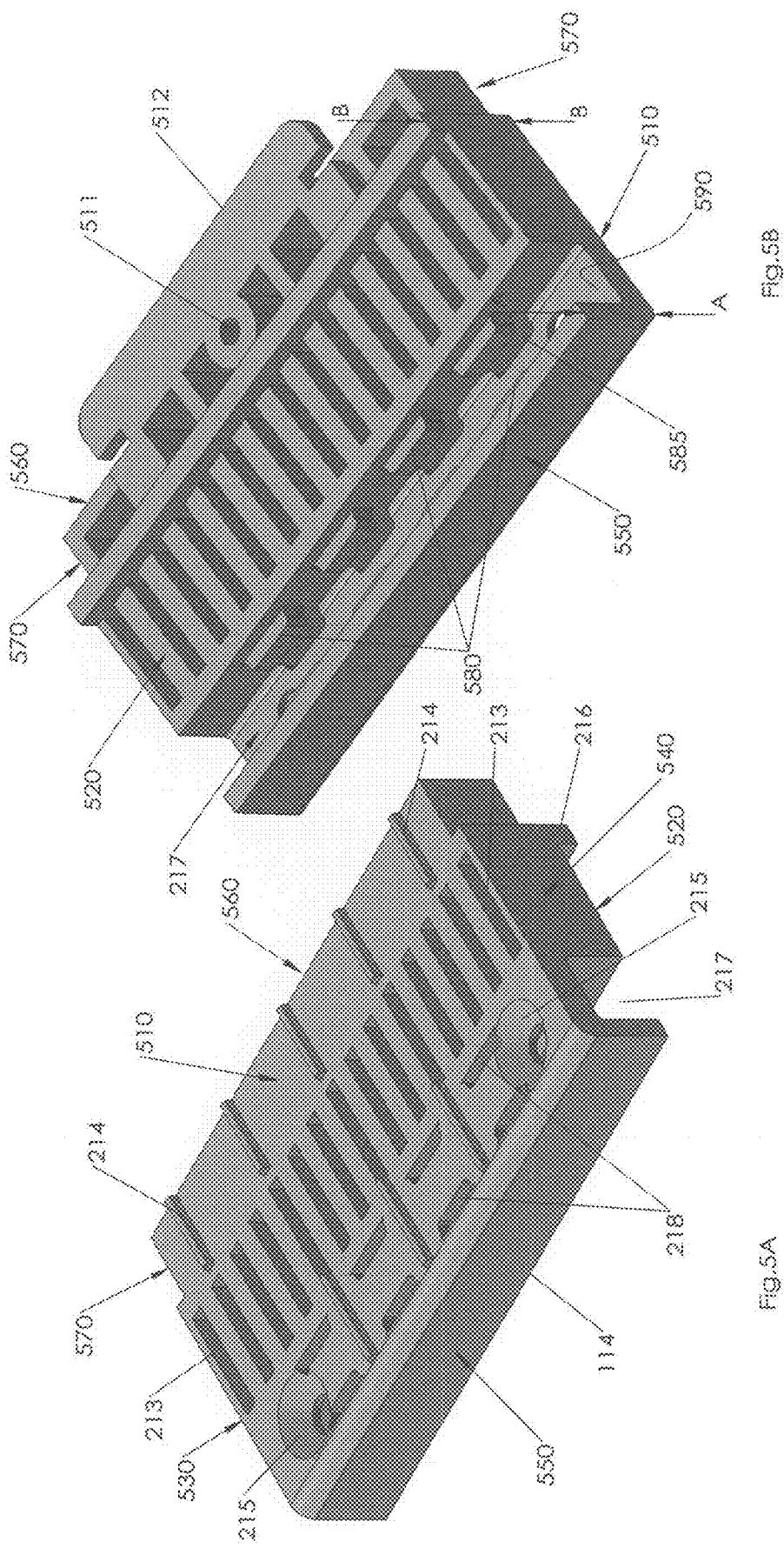

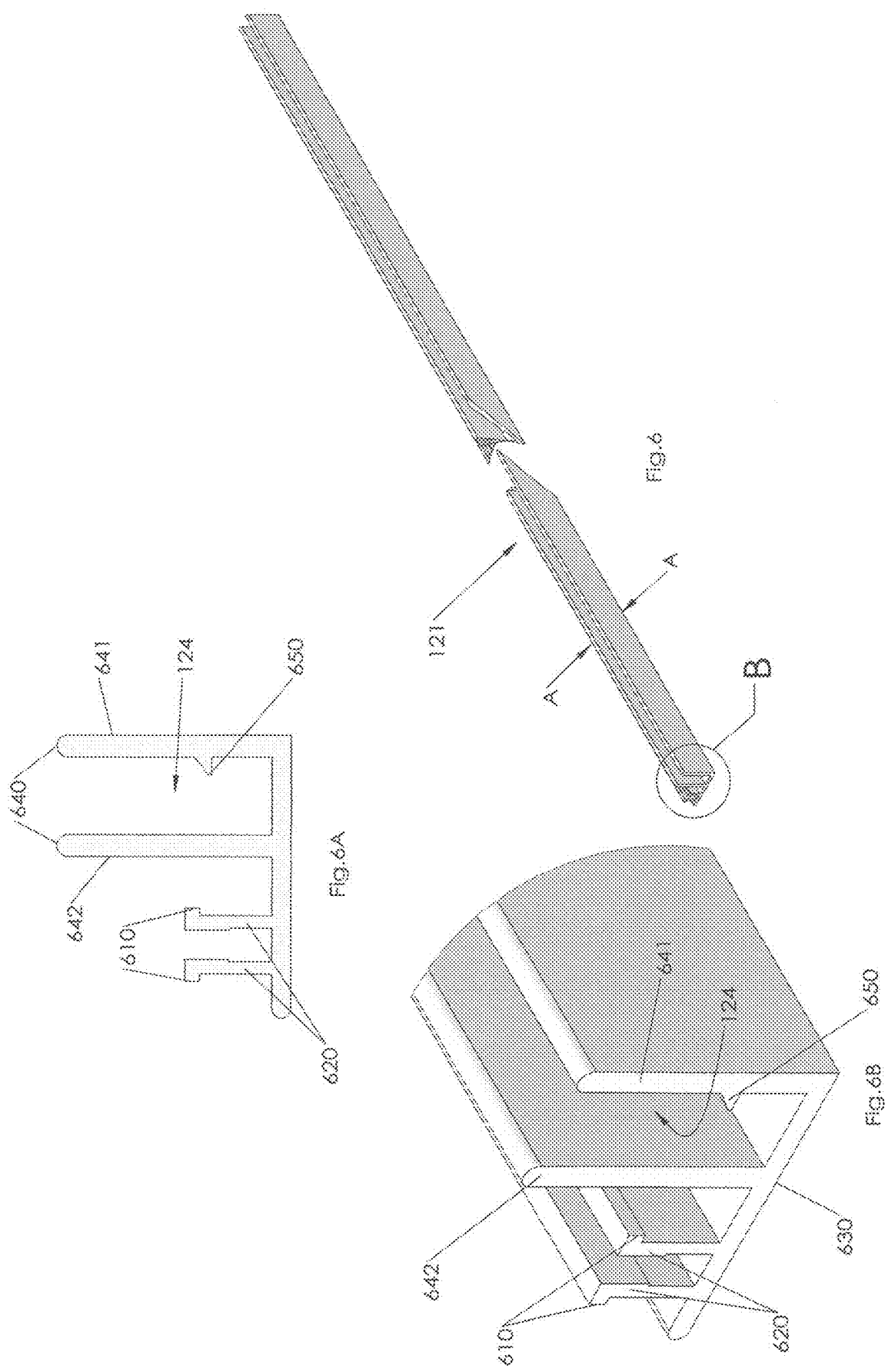

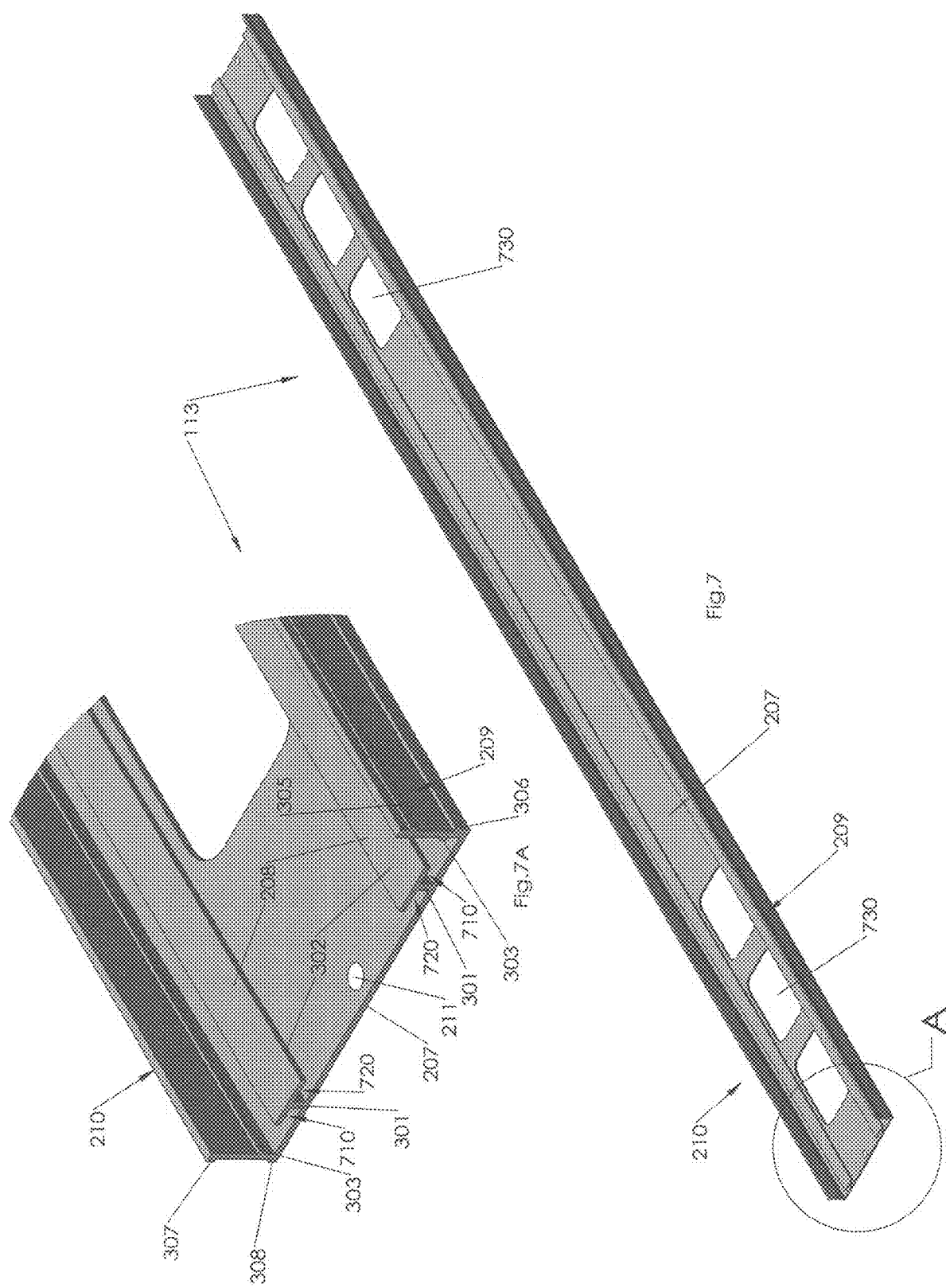

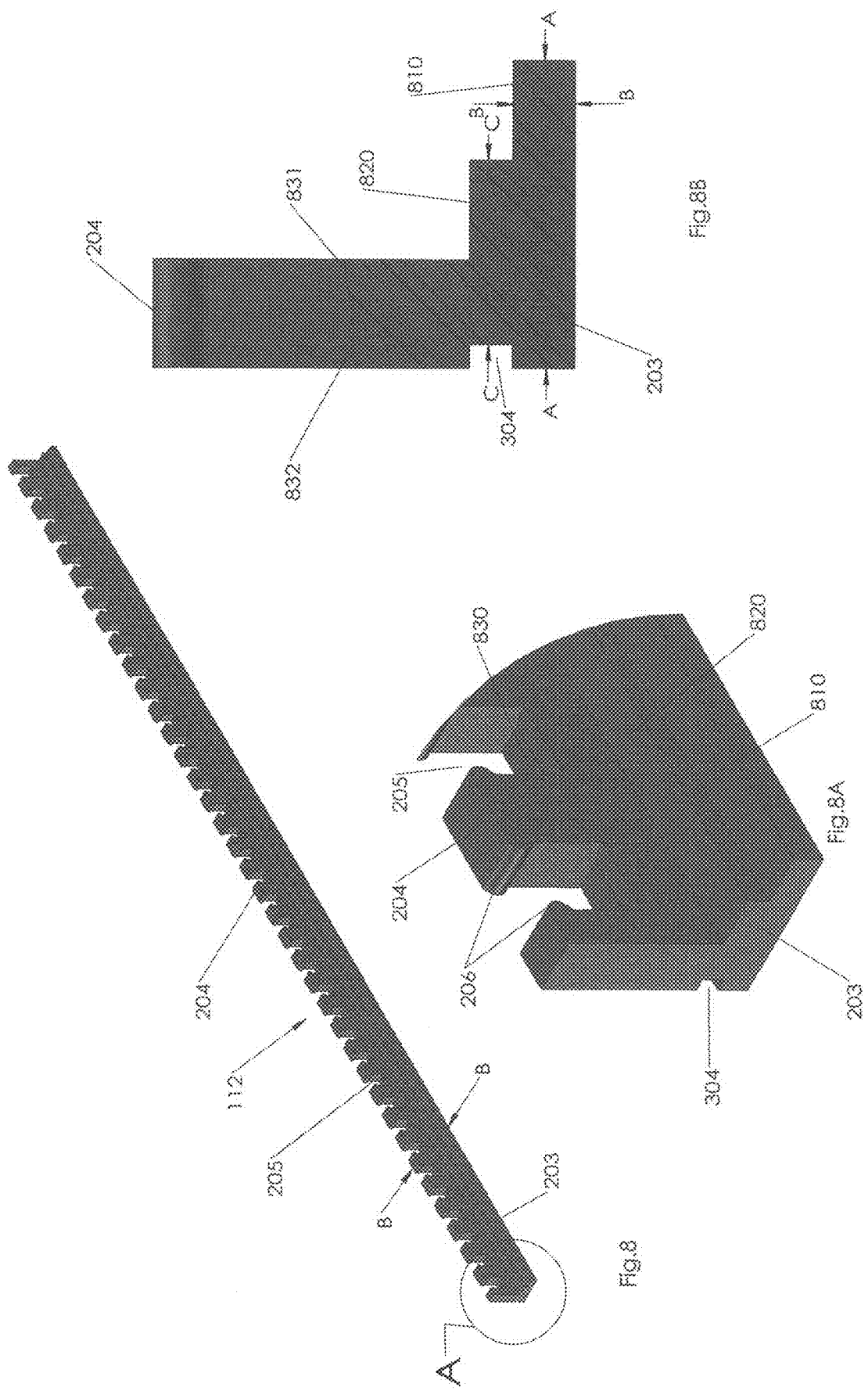

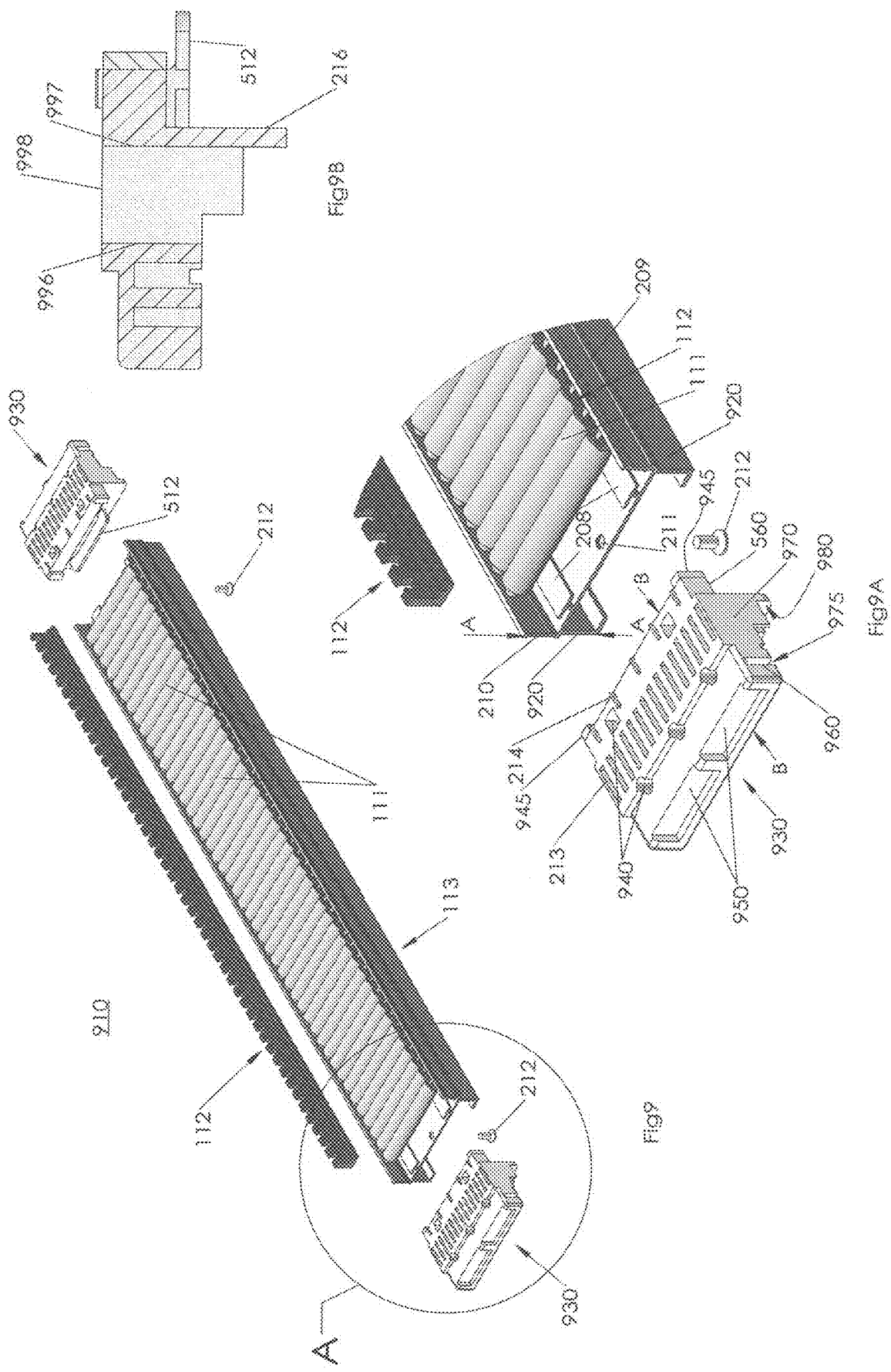

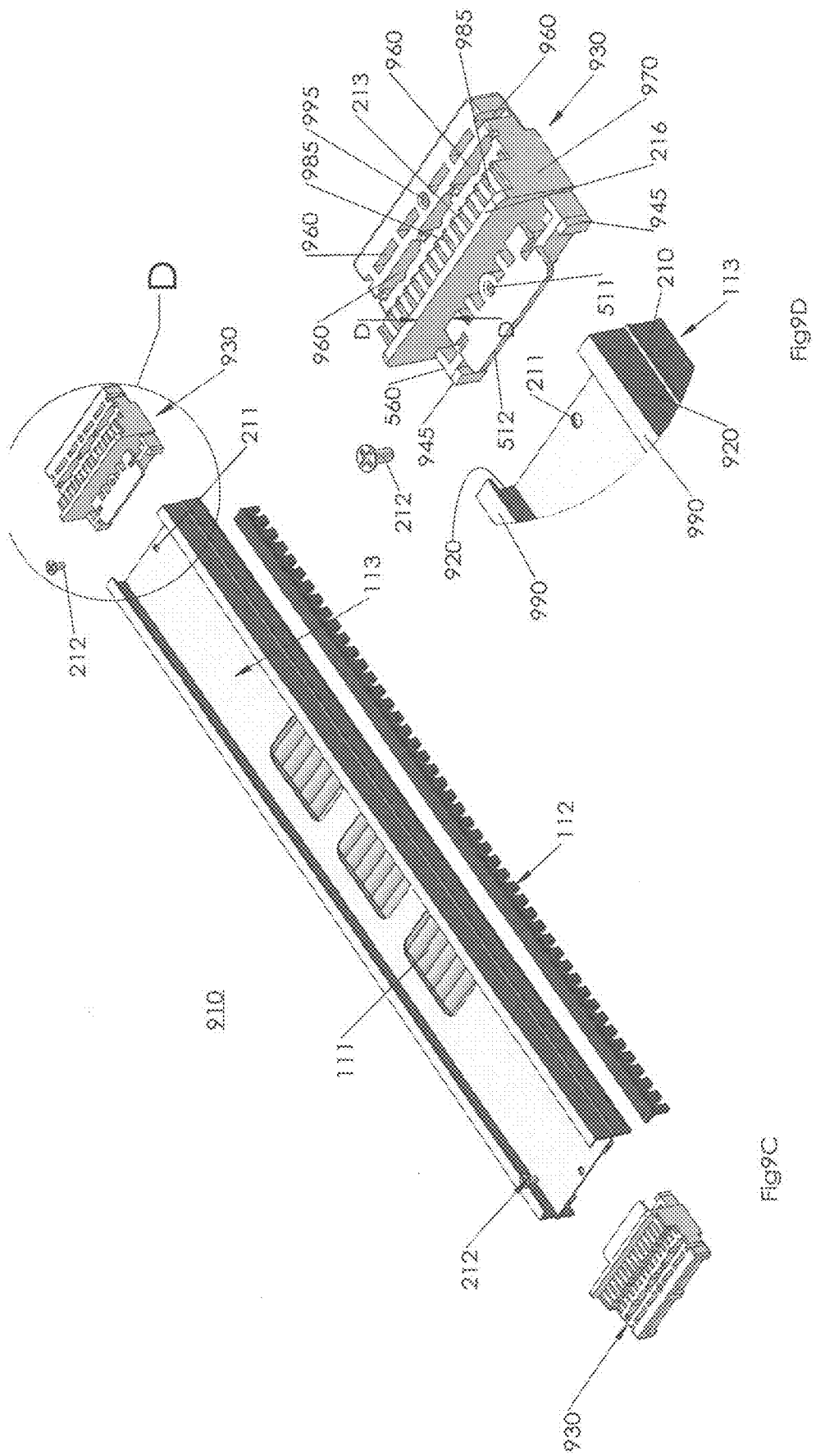

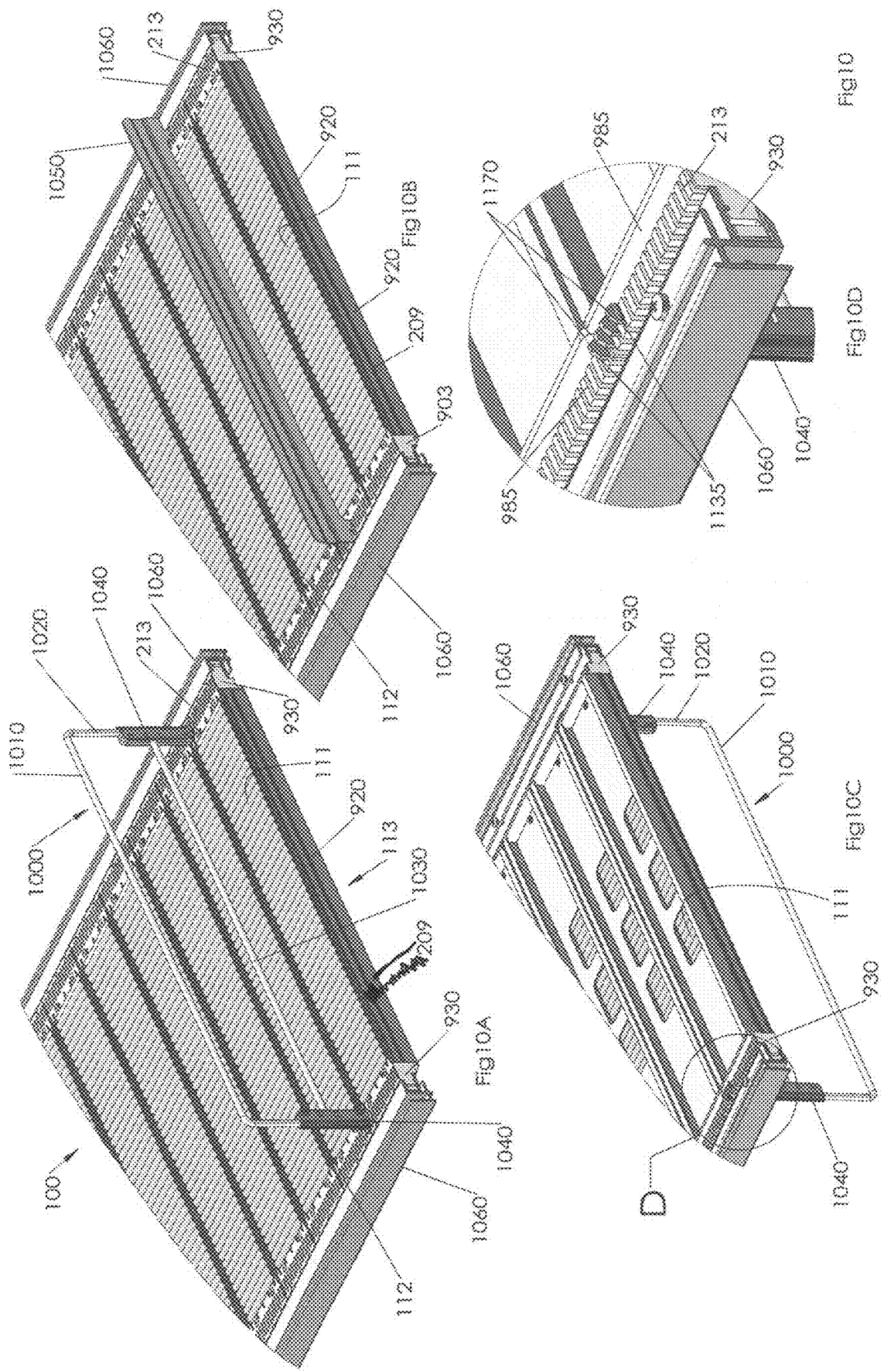

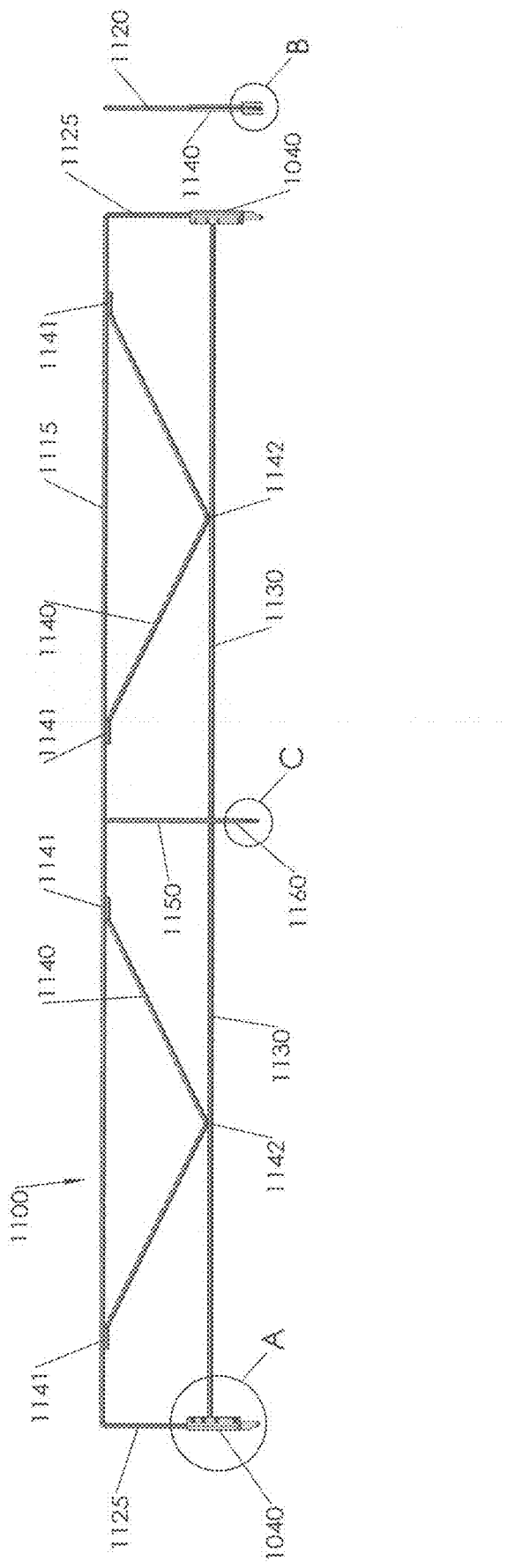

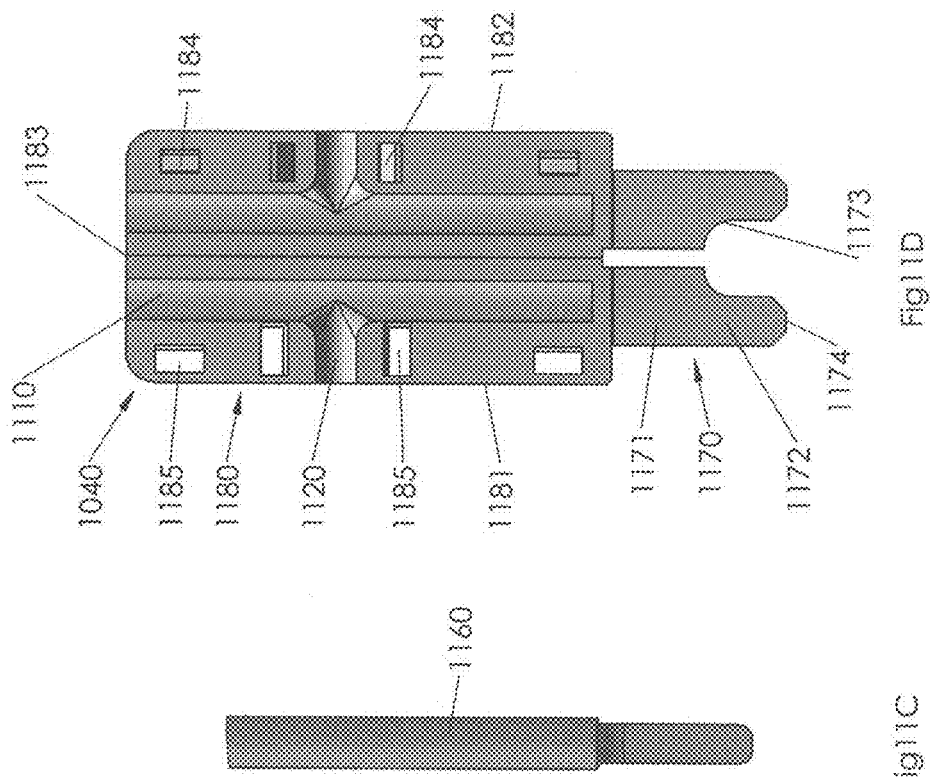
Fig11C
Fig11D
Fig11
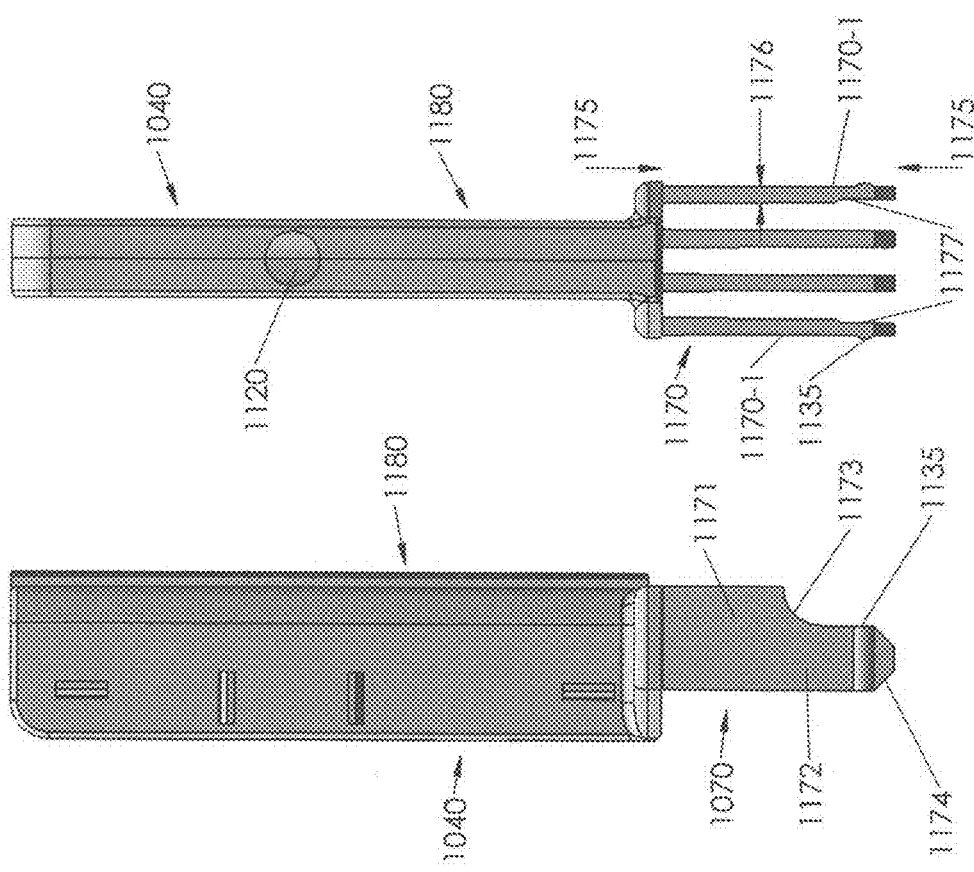
Fig11A
Fig11B

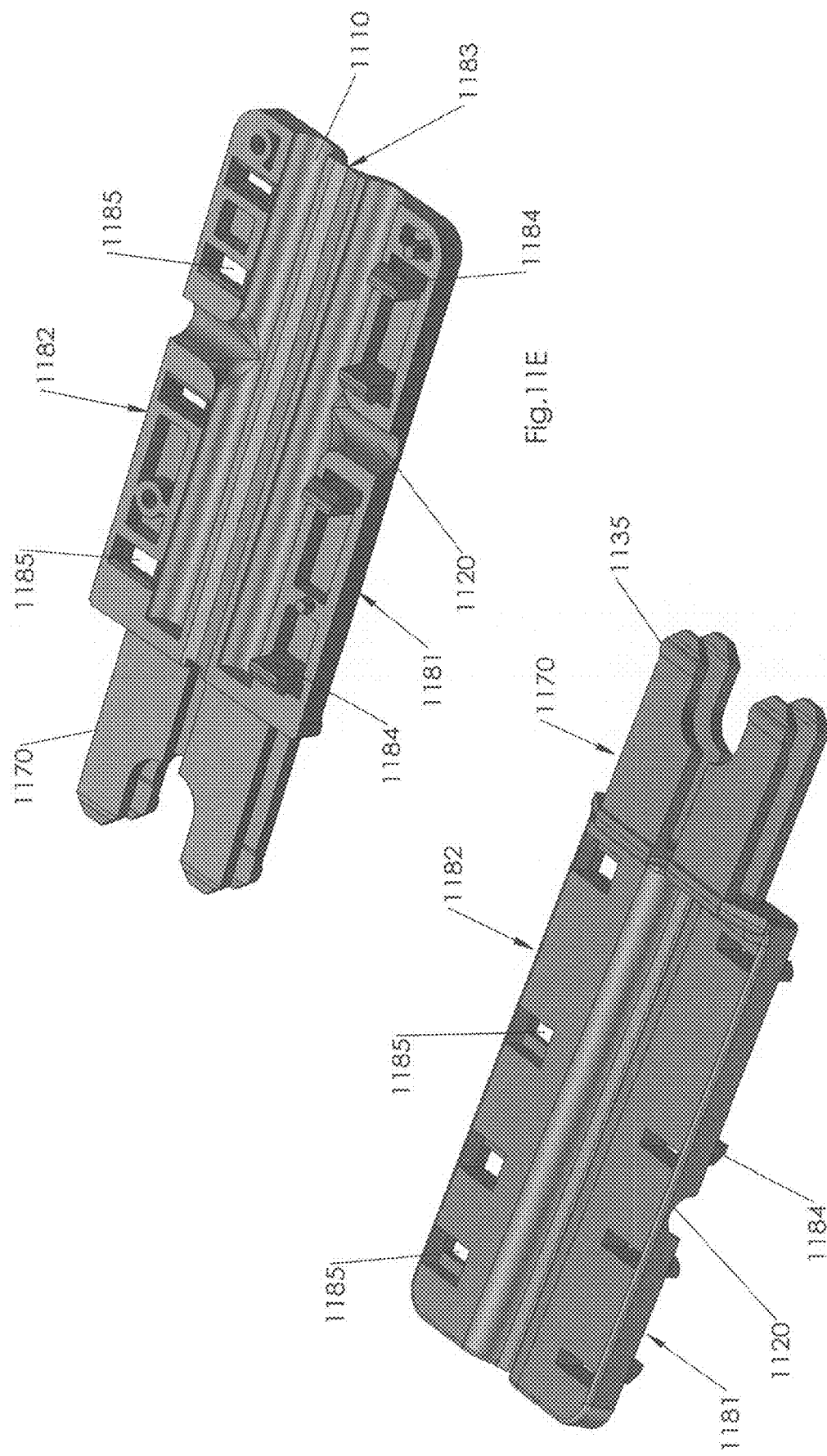

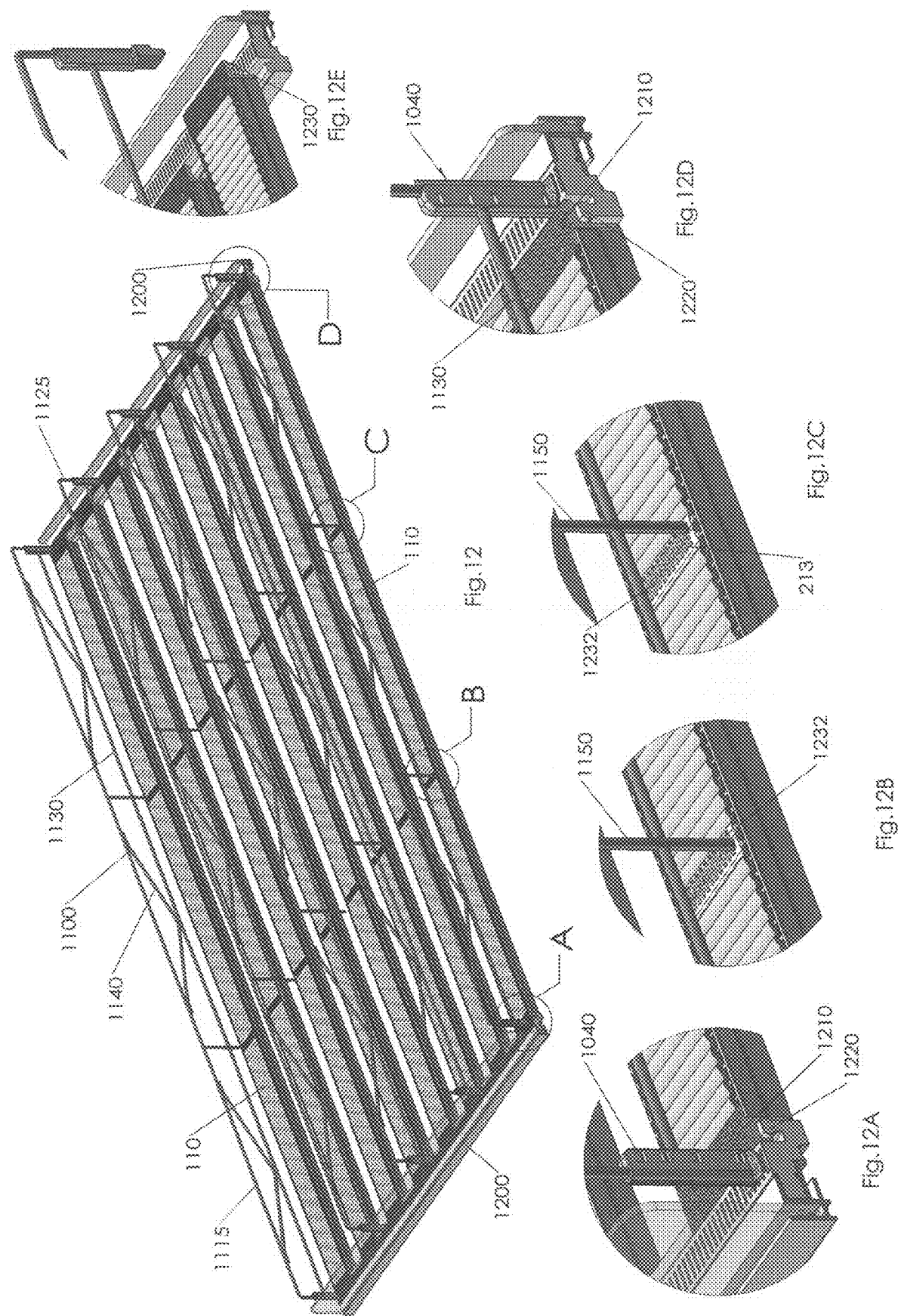

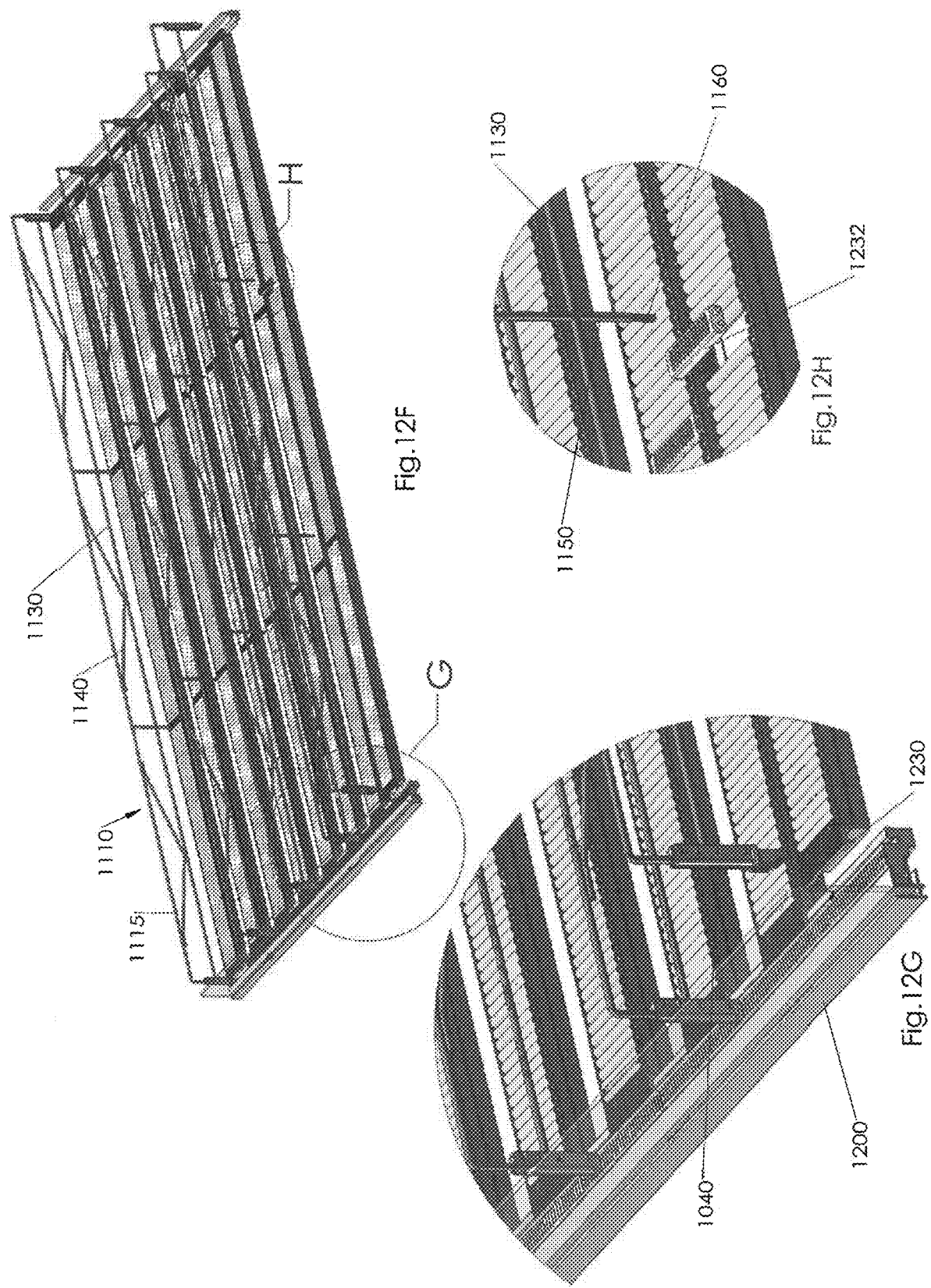

ROLLER TRACKS WITH REMOVABLE ROLLER SUPPORT BARS, CABLE DIVIDERS AND LIVING HINGES

CROSS-REFERENCED APPLICATION

This application claims priority to U.S. Provisional Patent Application Ser. No.: 62/850,351, filed May 20, 2019, the subject matters of which are incorporated herein in their entirety as if fully set forth verbatim herein.

BACKGROUND

1. Field of the Disclosure

The present disclosure relates generally to roller tracks that use gravity as a mechanism for moving an item thereon. More particularly, the present disclosure relates to roller tracks that can be used either as roller tracks or as a continuous roller mat comprised of roller tracks assembled side-by-side. The disclosed roller tracks can be used to create display systems for any width and/or depth by using "snap-in" technology. The roller tracks are suitable for use in applications that include open cooler shelving systems, in-door cooler shelving systems and non-cooler shelving systems. In short, the present disclosure provides a "one-for-all" design of roller tracks.

2. Description of Related Art

Items, such as medicines, first aid items, and health and beauty items packaged in boxes or bottles, and general merchandise such as coffee mugs or detergents, may be displayed in rows on a shelf having a mechanism that advances the items so that when one of the items is removed, another of the items is advanced and remains displayed. Other items, such soda, beer and water are frequently displayed in rows in refrigerated coolers having doors that may either slide or rotate to open to provide access to the interior of the cooler and to the refrigerated item. Refrigerated items can be advanced either by gravity along a wire shelf on which the items are displayed or using a mechanism that advances the items.

One such advancement mechanism configuration is a spring-pusher system that includes a spring-loaded pusher member. When an item within a row is removed, the spring-loaded pusher member urges the remaining items forward so that another item moves to the position of the removed item. Undesirably however, the force of the spring-loaded pusher member on the items often makes it difficult to remove the item from the front of the row and/or to insert items into the row, either by restocking or by a customer who has changed her/his mind. The force of the spring-loaded pusher member in such systems can result in package damage when inserting packages, and even more so for the front-most package in the row, causing product and revenue loss, as well as causing difficulty in replacing packages by customers who change their minds in product selection. Also, some items do not have standard, or uniform, sizes such as the above-mentioned coffee mugs that may be wider at the top than at the bottom. With these items, a spring-loaded pusher member can cause such items to tip over either to the front or back. At the least, all of the foregoing problems leave packages in an untidy state. Also, undesirably, the cost of installation of such spring-loaded pusher member shelf systems is quite high, and this is a deterrent for many potential customers (i.e., stores) to install these systems.

Another configuration is a conventional gravity feed roller shelving system. Such conventional gravity feed roller shelving systems often have rollers loosely disposed on a base portion, with each roller in its own holding chamber or cut-out and a retainer strip placed over the holding chambers or cut-outs of all of the rollers in a row in order to secure them to the base portion. Thus, if one roller needs to be removed and replaced, the retainer strip has to be removed, which frees all of the rollers from the base portion, allowing other rollers to accidentally dislodge from the base. Moreover, the retainer strip placed over the rollers is usually attached to the assembly via screws and should one of the screws loosen, then the rollers can become misaligned, inhibiting or preventing rollers from rotating properly.

An improved gravity feed roller shelving system having a simplified design and more efficient operation is described in U.S. Pat. No. 8,376,154. However, as with most other gravity feed roller seats, the gravity feed roller system of U.S. Pat. No. 8,376,154 is in the form of continuous plastic mats placed on a supporting system such as wire grids, metal frames and sheet metal shelves. Continuous mats are integral, strong and of general purpose, but their cost is relatively high, and some applications are difficult to accommodate due to constraints on some merchandise and packages. Also, the continuous mats require devices to drive the merchandise to the front along the inclined surface or to prevent merchandise from falling backward.

Another improved gravity feed roller shelving system is described in U.S. Patent Publication 2018/0110345. The gravity feed roller shelving system of U.S. Patent Publication 2018/0110345 relates to discrete gravity feed merchandise advancement seats as a mechanism for moving an item thereon via gravity, and methods for assembling the same. The discrete gravity feed merchandise advancement seats can satisfy up to 80% of the existing needs for merchandise displayed on shelving, including for small to big, low to tall, thin to thick, single to multi-packs cases, boxed, canned and bottled, lightweight to heady duty, regular to complex shapes, standard to custom, and dry to refrigerated packages.

The above two designs of U.S. Pat. No. 8,376,154 and U.S. Patent Publication 2018/0110345 are developments by the present inventor and work well for easy installation, easy management and easy cleaning at low cost.

As noted above, the present disclosure relates to roller tracks that can be used as either or both roller tracks and continuous roller mats assembled with roller tracks and are suitable for use in applications to include open cooler shelving systems, in-door cooler shelving systems and non-cooler shelving systems. As will be explained more fully in the detailed description that follows, the present disclosure relates to roller tracks that can be used individually or combined to provide the benefits of both individual tracks and continuous mats but avoid the shortcomings thereof. The present disclosure also provides roller tracks that can be in thicknesses of e.g., ⅜" or ¾", which are the standard depths required by retailers, by using a depth spacer element.

SUMMARY

One embodiment of the present disclosure relates to a roller track comprised of: a base having a length having two ends, a width having two edges, a top surface, and a bottom surface, wherein said base includes a first sidewall and a second sidewall disposed on each edge along said length substantially perpendicularly away from said top surface, and a first guide and a second guide disposed on said top surface adjacent to said first sidewall and said second sidewall, respectively; a first roller support bar and a second roller support bar configured to insert into and be held in place by said first guide and said second guide, respectively; and a plurality of rollers configured to insert into and be rotatably held by said first roller support bar and said second roller support bar.

Preferably, each of said first sidewall and said second sidewall includes a protrusion disposed on an inside surface thereof facing said first guide and said second guide, respectively, wherein each said protrusion is configured to engage a notch disposed on a surface of said first roller support bar and said second roller support bar facing said notch, respectively. Preferably, each of said first guide and said second guide comprises a neck disposed away from said top surface and a cross-bar disposed substantially perpendicularly on said neck, wherein said cross-bar forms a channel on either side of said neck. Also, preferably, each of said first guide and said second guide extends along said length substantially parallel to said first side and said second side, respectively.

Preferably, each of said first roller support bar and said second roller support bar comprises a stepped base that engages the opening between said channel between said neck and said protrusion disposed on the surface facing said first guide and/or said second guide. Preferably, each of said first roller support bar and said second roller support bar includes a plurality of roller supports and an opening disposed between adjacent roller supports, wherein protrusions are disposed proximal a top of each side of each roller support toward the opening, wherein roller supports, openings and protrusions are configured to provide a "snap-fit" for accepting a connecting pin disposed on each end of each roller. Preferably, the "snap-fit" feature allows for removably inserting said connecting pin of said roller into each opening. Also, preferably the dimension of the openings is such that the roller can rotate freely within the opening yet be retained by protrusions therein.

Preferably, said roller track further comprises a roller track head disposed at each end of said length. Preferably, each roller track head includes a top surface and a bottom surface, wherein said top surface includes at least one divider slot and at least one gliding rib, wherein said divider slot is configured to accept a securing member disposed proximal an end of a divider and wherein said gliding rib is configured to allow merchandise on said rollers to move from said rollers onto said roller track head.

Preferably, each first sidewall includes an upper protrusion and a lower protrusion on outer surface thereof and each second sidewall includes an upper protrusion and a lower protrusion on an outer surface thereof, wherein said first sidewall upper protrusion and lower protrusion are designed and configured engage said second sidewall upper protrusion and lower protrusion to provide a "snap-fit" between adjacent roller tracks such that roller tracks can be connected laterally.

One embodiment of the present disclosure relates to a cable divider comprising: at least a first longitudinal wire; a vertical wire connected at each end of the at first longitudinal wire; a plastic securing member connected to each vertical wire; and a plurality of lower connectors disposed substantially in a row connected to each plastic securing member opposite the connection of the vertical wires to each plastic securing member, wherein the plurality of lower connectors is disposed and configured to mate with a plurality of divider slots, one lower connector disposed in each slot, and wherein the plurality of lower connectors serves to hold cable divider firmly in place in the plurality of divider slots.

Preferably, the cable divider further comprises a central vertical wire connected to the at least one longitudinal wire at a location between each plastic securing member connected to each vertical wire, wherein the central vertical wire includes a securing member designed and configured to insert into a divider slot on a spacer that connects two roller bars or two roller tracks.

Preferably, the plastic securing member comprises a pair of engageable sides joined by a hinge and each engageable side includes a plurality of engageable clips that engage and lock with each other when the hinge is closed. Also, preferably, the cable divider further comprises a second longitudinal wire disposed between and connected to each plastic securing member connected to each vertical wire.

Preferably, the plastic securing member further comprises appropriately sized slots that are disposed and configured to accept the vertical wires of the first longitudinal wire. Also, preferably the plastic securing member further comprises appropriately sized slots that are disposed and configured to accept the second longitudinal wire. Preferably, each of the plurality of lower connectors includes a lower connector stem, a narrow portion connected to lower connector stem by a step and a tip, wherein the configuration of lower connector stem, narrow portion, step and tip allows lower connectors to fit into and engage a stepped divider slot. Preferably, the stepped divider slot has a wide portion designed and configured to accept and engage the lower connector stem and a narrow portion designed and configured to accept and engage the narrow portion.

Preferably, at least one lower connector further includes a protrusion disposed on the narrow portion proximal the tip, wherein the protrusion is designed and configured to engage and lock the plastic securing member into the divider slot. Preferably also, the hinge is a living hinge comprised of a thin portion connecting the pair of engageable sides.

One embodiment of the present disclosure relates to a securing member for securing a cable divider to a divider slot, said securing member comprising: an upper body portion designed and configured to accept at least one cable of said cable divider; and at least one lower connector which is disposed and configured to mate with a respective divider slot of a roller track, wherein said lower connector holds said cable divider firmly in place. Preferably, the securing member is formed from a pair of engageable sides joined by a hinge and each said engageable side includes a plurality of engageable clips that engage and lock with each other when said hinge is in the closed position.

Preferably, the securing member further comprises an aperture configured to accept a vertical cable of the first longitudinal cable, and may also further comprise a second aperture configured to accept the second longitudinal cable. Also, preferably, the at least one lower connector comprises a plurality of lower connectors and each of the plurality of lower connectors comprises a flexible lower connector stem, a narrow portion connected to said lower connector stem by a step and a tip, wherein the configuration of said lower connector stem, narrow portion, step and tip allows said lower connectors to fit into and engage a stepped divider slot, and wherein the stepped divider slot has a wide section designed and configured to accept and engage the lower connector stem and a narrow section designed and configured to accept and engage the narrow portion. Also, preferably, at least one lower connector of the securing member comprises a protrusion disposed on the narrow section proximal the tip wherein the protrusion is designed and configured to engage and lock plastic securing member into the divider slot. Preferably, the hinge is a living hinge comprised of a thin flexible portion connecting the pair of engageable sides.

Preferably also, the at least one lower connector is sufficiently flexible so that a cable divider secured to said securing member can be tilted from 10°-45° away from vertical without pulling out of a divider slot; more preferably, said securing member can be tilted from 20°-45° away from vertical without pulling out of a divider slot; and more preferably, said securing member can be tilted from 30°-45° away from vertical without pulling out of a divider slot.

BRIEF DESCRIPTION OF THE DRAWINGS

FIG. 1A is a detail view of section "A" of FIG. 1; and FIG. 1B is a detail view of section "B" of FIG. 1.

FIG. 2A is a detail view of section "A" of FIG. 2.

FIG. 5A is a top perspective view of a roller track head according to a preferred embodiment of the present disclosure; and FIG. 5B is a bottom perspective view of a rear head according to a preferred embodiment of the present disclosure.

FIG. 6 is a top perspective view of a stop according to a preferred embodiment of the present disclosure that can be used at the front or rear of the roller tracks; FIG. 6A is a cross-sectional view through line "A"-"A" of FIG. 6; and FIG. 6B is a detail view of section "B" of FIG. 6.

FIG. 7 is a top perspective view of a roller track base according to a preferred embodiment of the present disclosure; and FIG. 7A is a detail view of section "A" of FIG. 7.

FIG. 8 is a top perspective view of a roller support bar according to a preferred embodiment of the present disclosure; FIG. 8A is a detail view of section "A" of FIG. 8; and FIG. 8B is a cross-sectional view through line "B"-"B" of FIG. 8.

FIG. 9 is a partially disassembled and exploded view of a high-profile, i.e., thicker, roller track according to a preferred embodiment of the present disclosure; FIG. 9A is a detail view of section "A" of FIG. 9; FIG. 9B is a cross-sectional view through line "B"-"B" of FIG. 9A; FIG. 9C is a bottom view of the high-profile roller track shown in FIG. 9; and FIG. 9D is a detail view of section "D" of FIG. 9C.

FIG. 10A shows a top perspective view of a continuous roller mat comprised of a plurality of roller tracks that includes taller dividers (e.g., a cable divider) according to a preferred embodiment of the present disclosure; FIG. 10B shows a top perspective view of a continuous roller mat comprised of a plurality of roller tracks that includes a conventional metal divider; FIG. 10C shows a partial bottom view of the continuous roller mat of FIG. 10; and FIG. 10D shows a detail view of section "D" of FIG. 10C.

FIG. 11 shows a side view of an alternative cable divider according to a preferred embodiment of the present disclosure; FIG. 11A shows a close-up view of a plastic securing member shown in section "A" of FIG. 11; FIG. 11B shows a longitudinal close-up view of the plastic securing member of FIG. 11A as seen in "B" of FIG. 11; FIG. 11C shows a close-up view of section "C" of FIG. 11; FIG. 11D shows an open view of the inside of the plastic securing member shown in FIG. 11B; FIG. 11E, FIG. 11F and FIG. 11G are the tooling drawings similar to, but somehow different from FIG. 11A and FIG. 11D. FIG. 11E shows a perspective view of the inside of the plastic securing member similar to FIG. 11D; FIG. 11F shows a perspective view of the plastic securing member shown in FIG. 11E; and FIG. 11G shows an enlarged reversed view of the plastic securing member shown in FIG. 11F.

FIG. 12 shows a front top perspective view of an alternative embodiment of gravity-fed roller shelf systems; FIG. 12A shows a detail view of section "A" of FIG. 12; FIG. 12B shows a detail view of section "B" of FIG. 12; FIG. 12C shows a detail view of section "C" of FIG. 12; FIG. 12E shows a partially exploded view of FIG. 12D; FIG. 12F shows a partially exploded view of FIG. 12; FIG. 12G shows a detail view of section "G" of FIG. 12F; and FIG. 12H shows a detail view of section "H" of FIG. 12F.

DETAILED DESCRIPTION OF PREFERRED EMBODIMENTS

Preferred embodiments of the present disclosure as well as options thereof will now be described in conjunction with the Figures, in which like numerals denote like elements.

Figure 1:
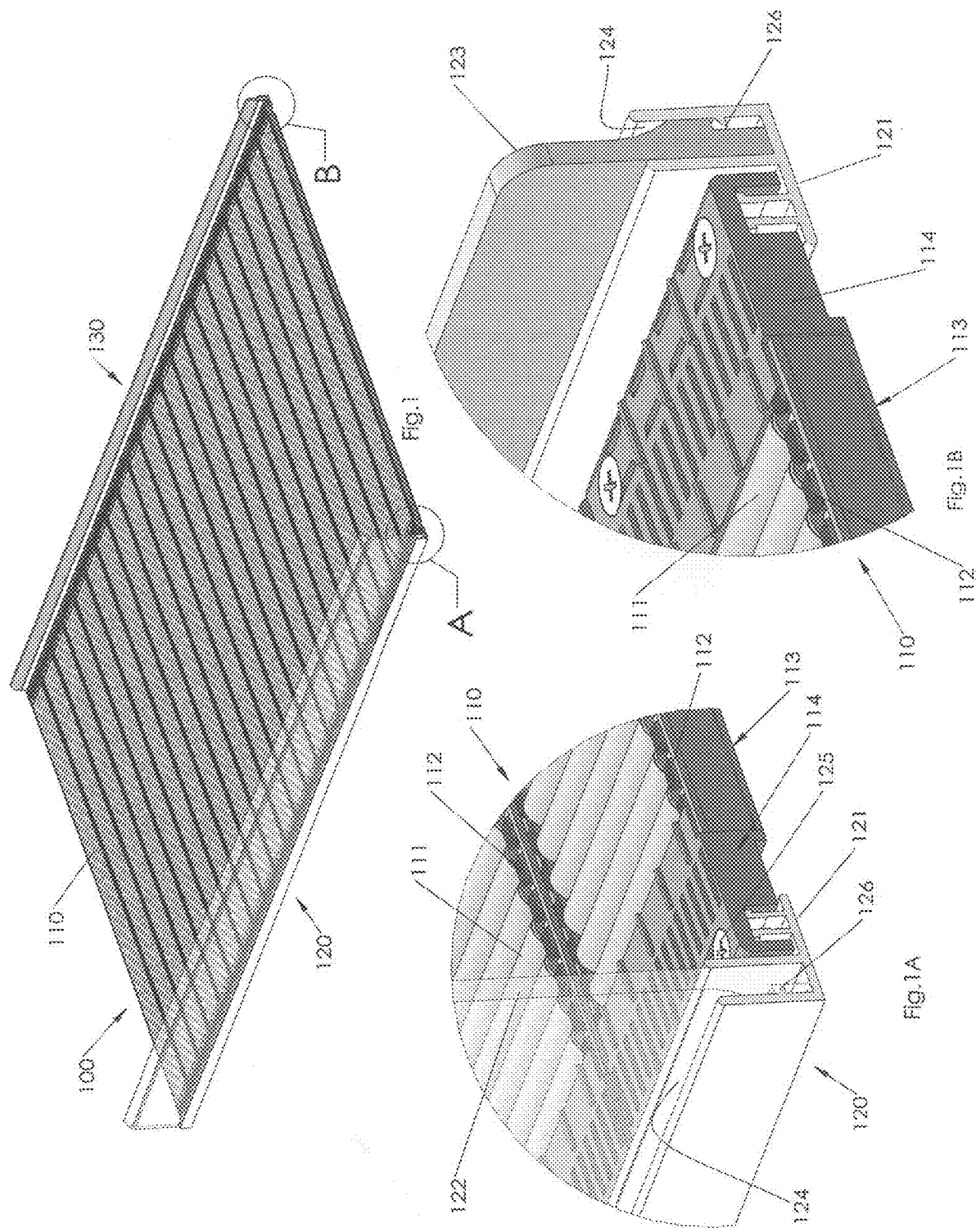
FIG. 1 is a top perspective view of a roller mat comprised of a plurality of roller tracks according to a preferred embodiment of the present disclosure.

FIG. 1 shows a top perspective view of a continuous roller mat 100. Continuous roller mat 100 is comprised of multiple roller tracks 110, a front stop 120 and a rear stop 130. As seen in FIG. 1A, each roller track 110 comprises a plurality of rollers 111, a plurality of roller support bars 112, and a roller track base 113. Front stop 120 includes a stop extrusion 121 and a front wall 122. Front stop 120 is connected to roller tracks 110 with a roller track head 114. Each of rollers 111, roller support bars 112, roller track base 113, roller track head 114, stop extrusion 121, and front wall 122, will be described in more detail in conjunction with other Figures. As seen in FIG. 1B, rollers 111, roller support bars 112, roller track base 113, roller track head 114 and stop extrusion 121 are all identical to what is shown in FIG. 1A. FIG. 1B also shows rear wall 123. Front wall 122 and rear wall 123 are designed and configured to slide into a channel 124 of stop extrusion 121. Each stop extrusion 121 includes a protrusion 126 that is configured to engage a clip (not shown) on each of front wall 122 and rear wall 123 to assist in maintaining front wall 122 and rear wall 123 firmly in stop extrusion 121. The structures and relationships between front wall 122 and rear wall 123 and protrusions 126 are described in more detail in conjunction with FIGS. 19-21 of U.S. Pat. No. 8,376,154. Roller track head 114 connects to stop extrusions 121 and roller track base 113 using screws 125 which will also be described in conjunction with other Figures.

Figure 2:
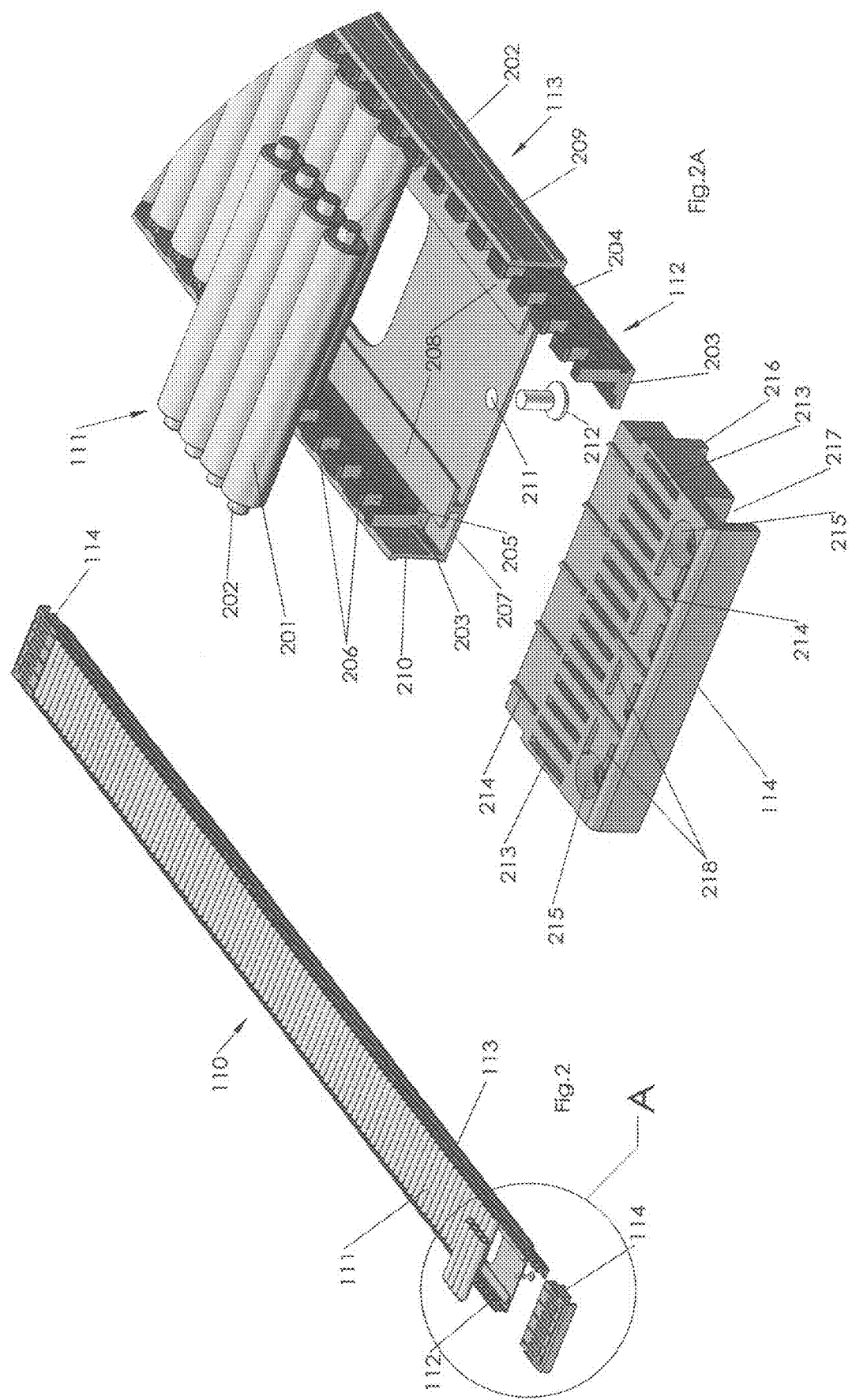
FIG. 2 is a partially disassembled and exploded view of a roller track according to a preferred embodiment of the present disclosure.

FIG. 2 shows a partially exploded view of a roller track 110, including rollers 111, roller support bars 112, roller track base 113 and roller track heads 114 connected to roller track 110 at each end thereof. FIG. 2A shows a partially exploded view of one end of roller track 110. As seen in FIG. 2A, each roller 111 comprises a cylindrical portion 201 and a connecting pin 202 at each end thereof. Each roller support bar 112 comprises a stepped base 203, a plurality of roller supports 204 disposed generally perpendicularly to stepped base 203, an opening 205 disposed between adjacent roller supports 204 and protrusions 206 disposed proximal a top of each side of each roller support 204. Roller supports 204, openings 205 and protrusions 206 are configured and disposed to provide a "snap-fit" feature for accepting connecting pins 202 disposed on each end of each roller 111. This "snap-fit" feature allows for removably inserting a connecting pin 202 into each opening 205. The dimension of openings 205 is such that roller 111 can rotate freely within opening 205 yet be retained by protrusions 206 therein. The relationship between connecting pins 202 and openings 205 will be described in more detail with respect to other Figures and has already been described in detail in U.S. Pat. No. 8,376,154 and U.S. Patent Publication 2018/0110345, which are incorporated herein by reference. Roller track base 113 includes a bottom 207, a pair of oppositely disposed guides 208, a right sidewall 209, a left sidewall 210, and a screw hole 211 designed and configured to accept a screw 212. Details of the configuration of stepped base 203, guides 208, right sidewall 209 and left sidewall 210 will be described in more detail in conjunction with other Figures. Each roller track head 114 includes a plurality of divider slots 213 disposed and configured to accept a "securing member" of a divider (not shown) that can be used to separate merchandise disposed on rollers 111, as is known to those skilled in the art. Each roller track head 114 also includes a plurality of gliding ribs 214 that are disposed and configured to allow merchandise disposed on rollers 111 to smoothly glide from rollers 111 to front wall 122. Each roller track head 114 also includes counter-sunk screw holes 215 designed and configured to accept screws 125, a spacer footing 216 and an open channel 217. Spacer footing 216 and open channel 217 will be described in more detail in conjunction with other Figures. Each roller track head 114 also includes a screw hole 511 (see, FIG. 5) designed and configured to align with screw hole 211 and accept screw 212. Lateral slots 218 are tooling slots which are used for tooling during construction and have no function with respect to roller track head 114.

Figure 3:
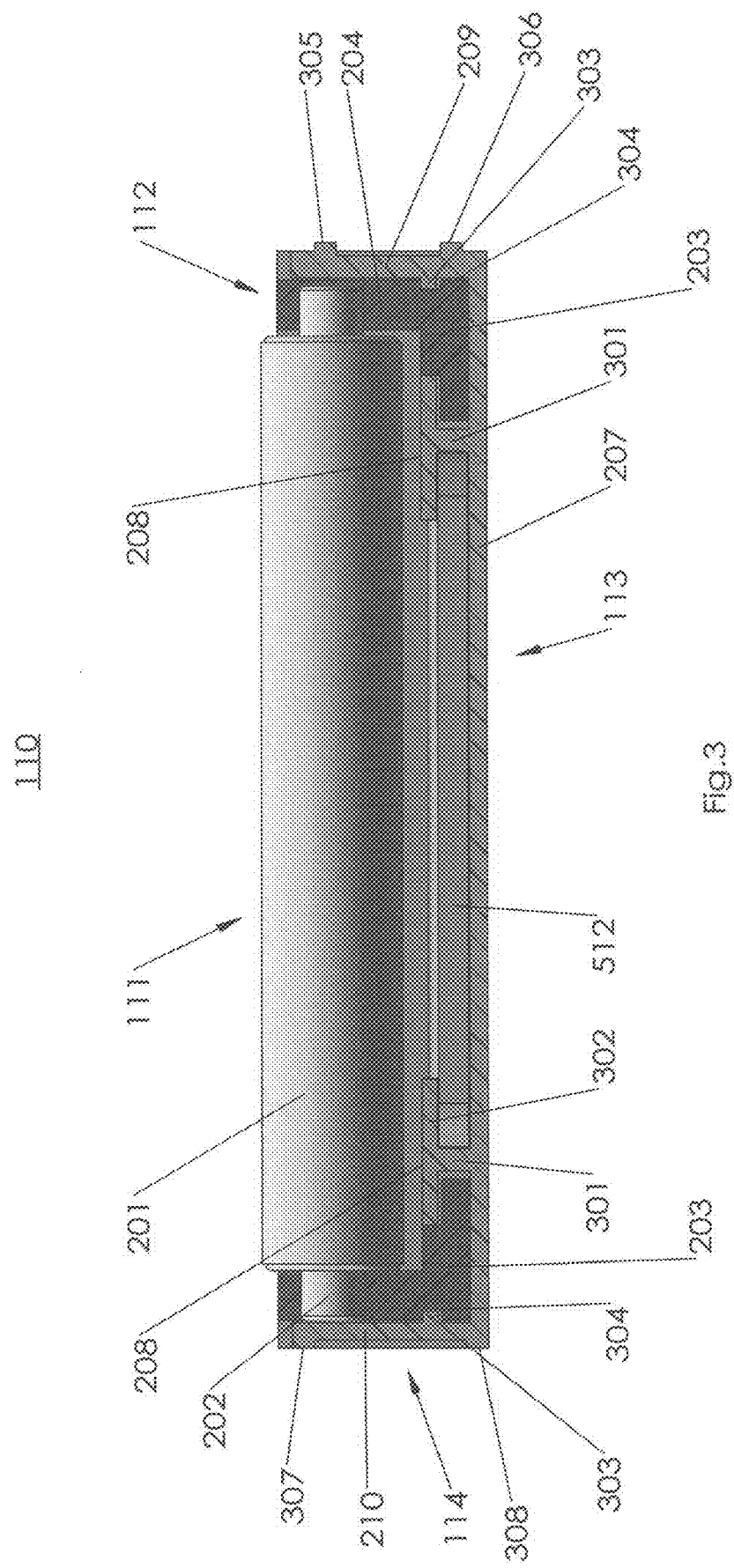
FIG. 3 is lateral cross-sectional view of an individual roller showing the arrangement of elements of a roller track according to a preferred embodiment of the present disclosure.

FIG. 3 shows a cross-section of roller track 110 showing the structural relationship between rollers 111, roller support bars 112, roller track base 113, and roller track head 114. In FIG. 3, connecting pins 202 are disposed in openings 205 between adjacent roller supports 204 to provide free rotation of rollers 111 in roller support bars 112. As noted with respect to FIG. 2, roller track base 113 includes bottom 207, oppositely disposed guides 208, right sidewall 209 and left sidewall 210. Guides 208 have a generally "T-shaped" structure including a neck 301 disposed substantially perpendicularly away from bottom 207 and a cross-bar 302 disposed substantially perpendicularly on neck 301. This configuration provides spaces 710, 720 (see, FIG. 7A) on either side of the neck 301 between bottom 207 and cross-bar 302. Spaces 710, 720 are designed and configured to accept stepped base 203 of roller support bars 112 and flange 512 (see, FIG. 5), respectively. Inner surfaces of right sidewall 209 and left sidewall 210 include an inner protrusion 303 designed and configured to engage a notch 304 on roller support bars 112. In combination, stepped base 203, neck 301 and cross-bar 302, protrusion 303, and notch 304 serve to allow longitudinal insertion of roller support bars 112 into roller track base 113 (see, FIG. 2A) and prevent roller support bars 112 from moving vertically away from bottom 207. Right sidewall 209 includes an exterior right sidewall upper protrusion 305 and an exterior right sidewall lower protrusion 306. Left sidewall 210 includes an exterior left sidewall upper protrusion 307 and an exterior left sidewall lower protrusion 308 that form a shallow "C" channel. Exterior right sidewall upper protrusion 305, exterior right sidewall lower protrusion 306, exterior left sidewall upper protrusion 307 and exterior left sidewall lower protrusion 308 are designed and configured to provide a frictional, or "snap-fit", between adjacent roller tracks 110 such that roller tracks 110 can be connected laterally.

Figure 4:
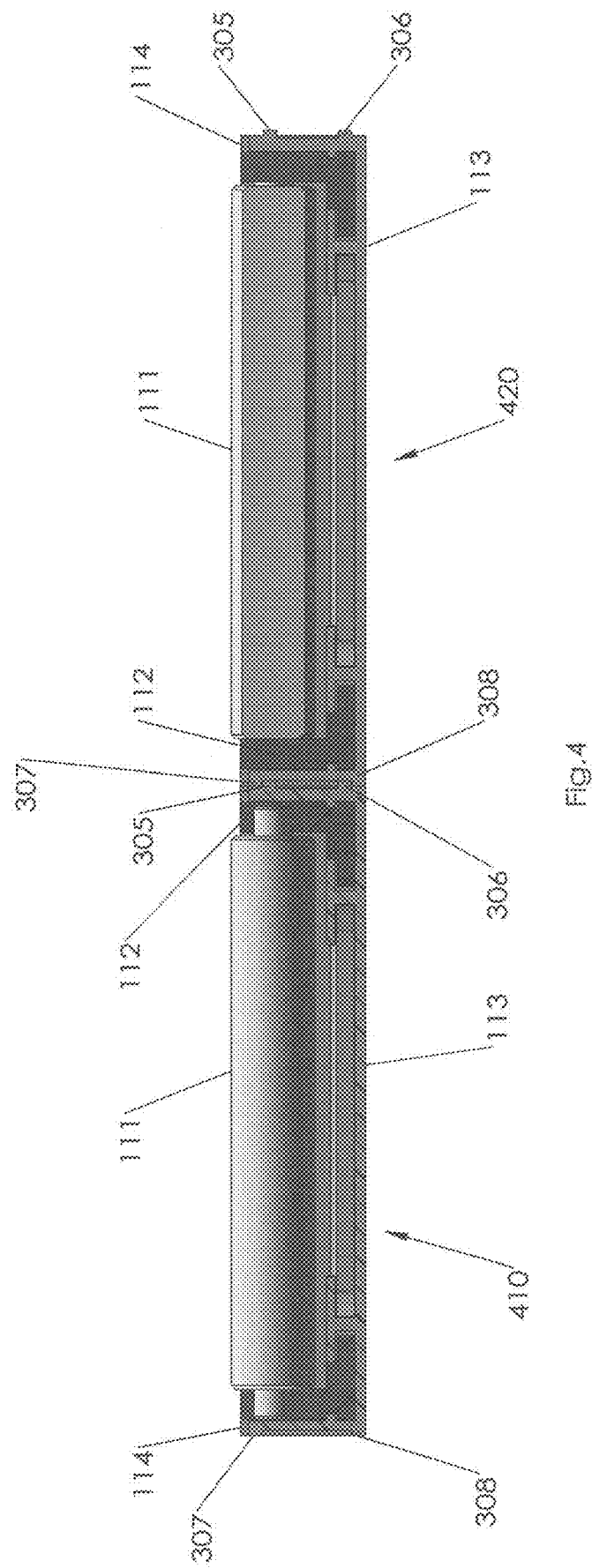
FIG. 4 is a lateral cross-sectional view of two connected roller tracks according to a preferred embodiment of the present disclosure.

FIG. 4 shows the lateral connection between two roller tracks 410 and 420. In FIG. 4, exterior right sidewall upper protrusion 305, exterior right sidewall lower protrusion 306 of roller track 410 engage exterior left sidewall upper protrusion 307 and exterior left sidewall lower protrusion 308 of roller track 420 to provide a pair of laterally connected roller tracks 110. In this manner, any number of roller tracks 110 may be laterally connected one to another.

FIG. 5A shows a top perspective view of a roller track head 114. Roller track head 114 includes a top surface 510, a bottom surface 520, a first side wall 530, a second side wall 540, a front wall 550, a rear wall 560 and two setbacks 570 (one in each of first side wall 530 and second side wall 540). As previously described in conjunction with FIG. 2A, roller track head 114 also includes a plurality of divider slots 213, a plurality of gliding ribs 214, counter-sunk screw holes 215, a spacer footing 216 and an open channel 217. Gliding ribs 214 are placed on top surface 510 in a longitudinal direction (i.e., in the direction of moving merchandise) and parallel to divider slots 213. Counter-sunk screw holes 215 are located proximal front wall 550 and first side wall 530 and second side wall 540, respectively. It will be appreciated that first side wall 530 and second side wall 540 are symmetrical in the preferred embodiment shown in FIGS. 5A and 5B. Setbacks 570 are provided so that roller track head 114 can slide flush against roller track 110 and recessed portion of roller support bars 112 (see, FIGS. 1A, 1B and 2A). This configuration allows gliding ribs 214 proximal rear wall 560 to substantially align with the top surface of rollers 111 to provide for smooth transfer of merchandise from top surface of rollers 111 onto roller track head 114 and against front wall 122. As shown in FIG. 5B, a plurality of head lockers 580 are disposed along opposing walls of open channel 217. Head lockers 580 are designed and configured to cooperatively engage a pair of flanges 610 disposed proximal an upper end of flange supports 620 of stop extrusion 121 (see, FIG. 6A) to lock roller track head 114 (and thus roller track 110) in position with respect to stop extrusion 121. Screws 125 are inserted into screw holes 215 and urge flange supports 620 apart such that flanges 610 engage a space 585 between head lockers 580 and an inner surface 590 of open channel 217 to hold roller track head 114 (and thus roller track 110) in position. As will be recognized, roller track head 114 is provided with two thicknesses, represented by lines "A"-"A" and "B"-"B", in the preferred embodiment shown in the Figures. Thickness "A"-"A" is provided so that when roller track head 114 is set in position on stop extrusion 121, the combination of thickness "A"-"A" and thickness of the base 630 (see, FIG. 6) of stop extrusion 121 is equal to the thickness "B"-"B". Similarly, thickness "B"-"B" is substantially the same as the thickness of the combination of bottom 207 of roller track base 113 and roller support bars 112 (see, FIGS. 1B and 3). In addition, FIG. 5B shows flange 512 that inserts into space 720 of roller track base 113. One screw 212 is used to fasten flange 512 (and thus roller track head 114) to roller track base 113 (see, FIG. 2A).

FIG. 6 shows a top perspective view of stop extrusion 121 according to a preferred embodiment of the present disclosure that can be used at the front or rear of roller tracks 110.

FIG. 6A is a cross-sectional view of stop extrusion 121 through line "A"-"A". Stop extrusion 121 includes a pair of flange supports 620, with each flange support 620 including a flange 610 disposed proximal an upper end of each flange support 620 such that flanges 610 are disposed in a direction away from each other (so as to engage space 585 between head lockers 580 and inner surface 590 of open channel 217 (see, discussion in conjunction with FIG. 5B)), a base 630 and a pair of retaining walls 640 comprised of an outer retaining wall 641 and an inner retaining wall 642. In the embodiment shown in FIG. 6A, retaining walls 640 are longer than flange supports 620. There is a stop protrusion 650 located on the inner surface of the outer retaining wall 641. Stop protrusion 650 serves to secure front wall 122 and/or rear wall 123 in channel 124 between outer retaining wall 641 and inner retaining wall 642. The low portion of the head locking wall is set back to create a little bigger space than the upper portion for screw fastening. The bottom of the front or rear stop extrusions (122 or 123) is flush with the side wall of the roller track base extrusion. The low portion of the head locking wall is set back to create a slightly larger space than the upper portion, for screw fastening. Screw 125 is inserted into hole 215 and the bottom of the front or rear stop extrusion 121 is then flush with the side wall of roller track base 113. The front portion of roller track base 113 fits into the space between flange supports 620 while the rear portion of roller track base stays within plastic hole 215 of plastic track head 114. It is desirable for screw 125 to be fastened as much as possible by the plastic wall of hole 215. The set-back of the low portion of the head locking wall 620 from the upper portion is designed so as not to touch the screw front portion. FIG. 6B is a detail view of an end of stop extrusion 121 shown in section "B" of FIG. 6.

FIGS. 7 and 7A show a right top perspective view of roller track base 113 according to a preferred embodiment of the present disclosure. As described above with respect to other Figures, roller track base 113 includes bottom 207, oppositely disposed guides 208, right sidewall 209, left sidewall 210, and screw hole 211 designed and configured to accept screw 212. Roller track base 113 also includes neck 301 disposed substantially perpendicular from bottom 207 that supports cross-bar 302. Spaces 710, 720 are designed and configured to accept stepped base 203 of roller support bars 112 and flange 512 of roller track head 114 (see, FIG. 5), respectively. Inner surfaces of right sidewall 209 and left sidewall 210 each include inner protrusion 303 designed and configured to engage notch 304 on roller support bars 112. In combination, stepped base 203, neck 301 and cross-bar 302, protrusion 303, and notch 304 serve to allow longitudinal insertion of roller support bars 112 into roller track base 113 (see, FIG. 2A) and prevent roller support bars 112 from moving vertically away from bottom 207. Right sidewall 209 includes exterior right sidewall upper protrusion 305 and exterior right sidewall lower protrusion 306. Left sidewall 210 includes exterior left sidewall upper protrusion 307 and exterior left sidewall lower protrusion 308 that form a shallow "C" channel. Exterior right sidewall upper protrusion 305, exterior right sidewall lower protrusion 306, exterior left sidewall upper protrusion 307 and exterior left sidewall lower protrusion 308 are designed and configured to allow adjacent roller tracks 110 to be connected laterally. There are multiple openings 730 in bottom 207 to reduce material use and weight, as well as to allow liquid to drain or the removal of small pieces of debris, as necessary. In addition to their structural cooperation with other elements of the present disclosure, sidewalls 209, 210 and oppositely disposed guides 208 enhance rigidness to support weight loads on roller track 110. Roller track base 113 can be a metal or plastic extrusion and can easily be sized to specification as needed. The referred structure is designed for ease of assembly and reliability of interlocking of roller support bars 112 and roller track heads 114. Material for roller track base 113 can be selected from aluminum, steel, plastic, and other extrudable materials. FIG. 7B shows details of section "A" of FIG. 7.

FIG. 8 shows a top perspective view of a roller support bar 112 according to a preferred embodiment of the present disclosure. FIG. 8A shows a detail view of section "A" of FIG. 8 and FIG. 8B is a cross-sectional view through line "B"-"B" of FIG. 8. As discussed above in conjunction with FIGS. 2 and 3, each roller support bar 112 comprises stepped base 203, roller supports 204 disposed generally perpendicularly to stepped base 203, opening 205 disposed between adjacent roller supports 204, and protrusions 206 disposed proximal a top of each side of each roller support 204. Stepped base 203 includes a lower step 810 and an upper step 820. Lower step 810 has a width (line "A"-"A" in FIG. 8B) and a thickness (line "B"-"B" in FIG. 8B) that are designed and configured to fit into space 710 (see, FIG. 7) formed by the combination of left sidewall 209 (or right sidewall 210), neck 301 and protrusion 303. Upper step 820 has a width (line "C"-"C" in FIG. 8B) that is designed and configured to fit into the gap (unnumbered) between protrusion 303 and outer edge of cross-bar 302 (see, FIG. 3). Roller supports 204, openings 205 and protrusions 206 are disposed and configured to provide a "snap-fit" feature for accepting connecting pins 202 disposed on each end of each roller 111. This "snap-fit" feature allows for removably inserting connecting pins 202 into each opening 205. The dimension of openings 205 is such that roller 111 can rotate freely within opening 205 yet be retained by protrusions 206 therein. Each opening 205 has a base 830 that is comprised of a convex portion 831 and a flat portion 832. This configuration reduces the surface area against which connecting pins 202 rotate, thus reducing friction therebetween. Roller track base 113 can be cut from the standard extrusion length according to need. The key is the length of roller support bars 112. Usually, the standard length of one roller support bar 112 is a length such as 16", and any other shorter length can be cut from the standard length. Furthermore, two longitudinal roller support bars 112 can be connected to each other within space 710, thereby keeping rollers 111 in proper parallel arrangement. Therefore, any length of roller support bar 112 can be provided.

FIGS. 9 and 9A show a high-profile, i.e., a thicker roller track 910 comprising the same portions of thinner roller track 110 as shown in FIGS. 1-8. FIG. 9 shows a partially disassembled and exploded view of thicker roller track 910 and FIG. 9A shows a detail view of section "A" of FIG. 9. One difference between thicker roller track 910 and thinner roller track 110 is the thickness, i.e., the dimension of line "A"-"A" in FIG. 9A of the roller track base 113 is greater than that of thinner roller track 110 as shown in FIGS. 1-8. Roller track base 113 divides the side wall into two portions: an "upper portion" comprised of right sidewall 209 and left sidewall 210 and a "lower portion" 920. The upper portion is the same as that of the thinner roller track 110 as shown in FIGS. 1-8. Lower portion 920 provides the additional thickness to thicker roller track 910. The height of lower portion 920 of right sidewall 209 and left sidewall 210 can be varied depending on applications. Both fixed and adjustable lower portions 920 can be designed. In addition, roller track heads 930 of high-profile/thicker roller track 910 are different than those of roller track head 114, including a side wall 970 having a two-step profile comprised of a first step 975 and a second step 980. First step 975 accommodates thickness of stop extrusion 121 in the same manner as roller track head 114 (see, FIG. 1B) and second step 980 reduces the amount of material used during molding. Roller track heads 930 attach to roller track base 113 using screw 212 through screw hole 211 and into screw hole 511 in a similar manner to roller track head 114 (see, FIG. 5). There are several sunken portions 940 on the top surface of higher-profile/thicker roller track head 930, shallow setback portions 950 on the front surface of higher-profile/thicker roller track head 930, and side/bottom slots 960 (see, FIG. 9C), all of which are for tooling requirements. FIG. 9B shows a cross-sectional view through line "B"-"B" of FIG. 9A. FIG. 9B shows a stepped divider slot 998 having a stepped configuration comprised of a short divider slot wall 996 and a long divider slot wall 997. This configuration allows stepped divider slot 998 to accept both conventional metal dividers 1050 and cable dividers 1000 and 1100 (shown in FIGS. 10A and 11, respectively). able dividers 1000, 1050, 1110 can be at least one selected from the group consisting of: wire, line, thread, rope and cord. Conventional metal dividers 1050 can have any height, typically from 1" to 5", while cable dividers 1000, 1100 typically have heights from 3" to 5". The height of the dividers is decided by merchandise Planogram (POG) and end-user requirements. The thickness of conventional metal divider 1050 is generally less than about 3/32" while cable dividers 1000, 1100 generally have a thickness of 3/8"-1/4". Therefore, in the case of tight lateral facings of the POG, conventional metal dividers 1050 will be selected while cable dividers 1000, 1100 are widely used in in-door coolers. The related securing member can be designed with different dimensions to meet the specifications, as needed.

FIG. 9C shows a bottom view of FIG. 9, and FIG. 9D shows a detail view of section "D" of FIG. 9C. As shown in FIG. 9C, all of the elements of roller track 910 are the same as those in FIG. 9. FIG. 9D shows a detail view of the underside of roller track head 930. In FIG. 9D, roller track head 930 attaches to roller track base 113 using screw 212 through screw hole 211 on base 113 and into screw hole 511 in roller track head 930. As mentioned above, roller track base 113 has lower portion 920 that provides the additional thickness for thicker roller track 910. Each side of lower portion 920 has a flange 990 disposed substantially perpendicular to each side of lower portion 920, respectively, and toward each other. Flanges 990 provide stability for roller track 910 when disposed on a shelf. To compensate for the thickness provided by lower portion 920 and flanges 990, roller track head 930 is provided with a matching thickness, indicated by line "D"-"D". Roller track head 930 also includes a plurality of ribs 985, each of which is disposed between adjacent divider slots 213. Ribs 985 serve to interlock with a protrusion 1135 on a lower connector 1170 of a plastic securing member 1040 (see, FIGS. 10D and 11B) that will be more fully described in conjunction with those Figures. Roller track head 930 is attached to a stop extrusion 1060 (see, FIGS. 10A-10D) using a screw (not shown) that passes through stop extrusion 1060 and into screw hole 995. Stop extrusion 1060 is of a different design than stop extrusion 121 and is described in detail in conjunction with FIG. 12 (i.e. element 2) of U.S. Pat. No. 8,376,154. As can also be seen in FIG. 9D, roller track head 930 includes spacers 945, attached to rear wall 560 that may be inserted into a space between right sidewall 209 and left sidewall 210 of roller track base 113 and cross-bar 302. This space is for roller support bar 112 and spacers 945 are designed to fill any possible empty space between roller support bar 112 and rear wall 560. The length of spacers 945 can be adjusted by tooling depending on the length of roller support 112.

FIG. 10A shows a top perspective view of a continuous roller mat 100 comprised of a plurality of roller tracks 110 that includes a cable divider 1000. Cable divider 1000 includes an upper longitudinal wire 1010 that is connected to a pair of vertical wires 1020 at either end of upper longitudinal wire 1010. The length of vertical wires 1020 may be varied depending on the height of merchandise to be disposed on continuous roller mat 100. Cable divider 1000 also includes lower longitudinal wire 1030. Lower longitudinal wire 1030 provides stiffness and strength to cable divider 1000 as well as preventing merchandise on continuous roller mat 100 from skewing at the bottom from side to side. Cable divider 1000 also includes a plastic securing member 1040. Plastic securing member 1040 includes a plurality of appropriately sized slots 1110, 1120 (see, FIGS. 11B and 11D) that accept vertical wires 1020 of upper longitudinal wire 1010, and lower longitudinal wire 1030. Upper longitudinal wire 1010 and lower longitudinal wire 1030 can be held in slots 1110, 1120 by tight fit, set screw, glue or other appropriate mechanism. Plastic securing member 1040 includes a plurality of lower connectors 1170 (see, e.g., FIGS. 11A and 11B) that mate with stepped divider slot 998 and serve to hold cable divider 1000 firmly in place and to reduce tilting of taller/heavier merchandise on continuous wire mat 100. FIG. 10B shows a top perspective view of a continuous roller mat 100 comprised of a plurality of roller tracks 110 that includes a conventional metal divider 1050. Conventional metal divider 1050 has been fully described in conjunction with, e.g., FIGS. 2 and 31 of U.S. Patent Publication 2018/0110345, incorporated herein by reference. FIG. 10C shows a bottom view of the continuous roller mat of FIG. 10, and all elements therein have been previously described. FIG. 10D shows a detail view of section "D" of FIG. 10C. As can be seen in FIG. 10D, ribs 985 between adjacent diver slots 213 serve to interlock with protrusion 1135 on each of the two outermost lower connectors 1170 of plastic securing member 1040 (see, FIG. 11B). This configuration prevents lateral pressure on cable divider 1000 from taller/heavier merchandise on continuous roller mat 100 from causing cable divider to possibly pull out of divider slots 213 while at the same time allowing cable divider 1000 (and cable divider 1100) to flex from side to side up to 30°-45° degrees from vertical and return to vertical position, as will be described in detail in conjunction with FIG. 11-11D.

FIG. 11 shows a side view of a cable divider 1100 that is designed and configured to be used in conjunction with a deeper shelf. Cable divider 1100 includes an upper longitudinal wire 1115 that is connected to a pair of vertical wires 1125 at either end of upper longitudinal wire 1115 that are similar to those described in conjunction with FIGS. 10A-10D. Cable divider 1100 also includes two lower longitudinal wires 1130. Lower longitudinal wires 1130 provide stiffness and strength to cable divider 1100 as needed, depending on the depth of the shelf on which continuous roller mat 110 is disposed. Cable divider 1100 also includes a plastic securing member 1040 disposed at each end. Cable divider 1100 also includes a pair of V-shaped brace wires 1140 that provide vertical and longitudinal strength to cable divider 1100 when used on a deeper shelf. Brace wires 1140 are connected to upper longitudinal wire 1115 and lower longitudinal wires 1130 at points 1141 and 1142, respectively. Although shown as V-shaped, brace wires 1140 could be X-shaped or otherwise, and the function of brace wires 1140 could be attained by other means that will be apparent to those of skill in the art, such as by a plurality of vertical wires disposed between upper longitudinal wire 1115 and lower longitudinal wire 1130, or one or more additional longitudinal wires disposed as appropriate. Cable divider 1100 also includes a medial vertical wire 1150 that also provides vertical and longitudinal strength to cable divider 1100. Medial vertical wire 1150 has a securing member 1160 (see, FIG. 11C) that inserts into divider slots on a spacer (not shown here, but shown in FIG. 12B and FIG. 12C) that is used on a longer roller track 110 to accommodate merchandise on a deeper shelf.

Figure 11G:
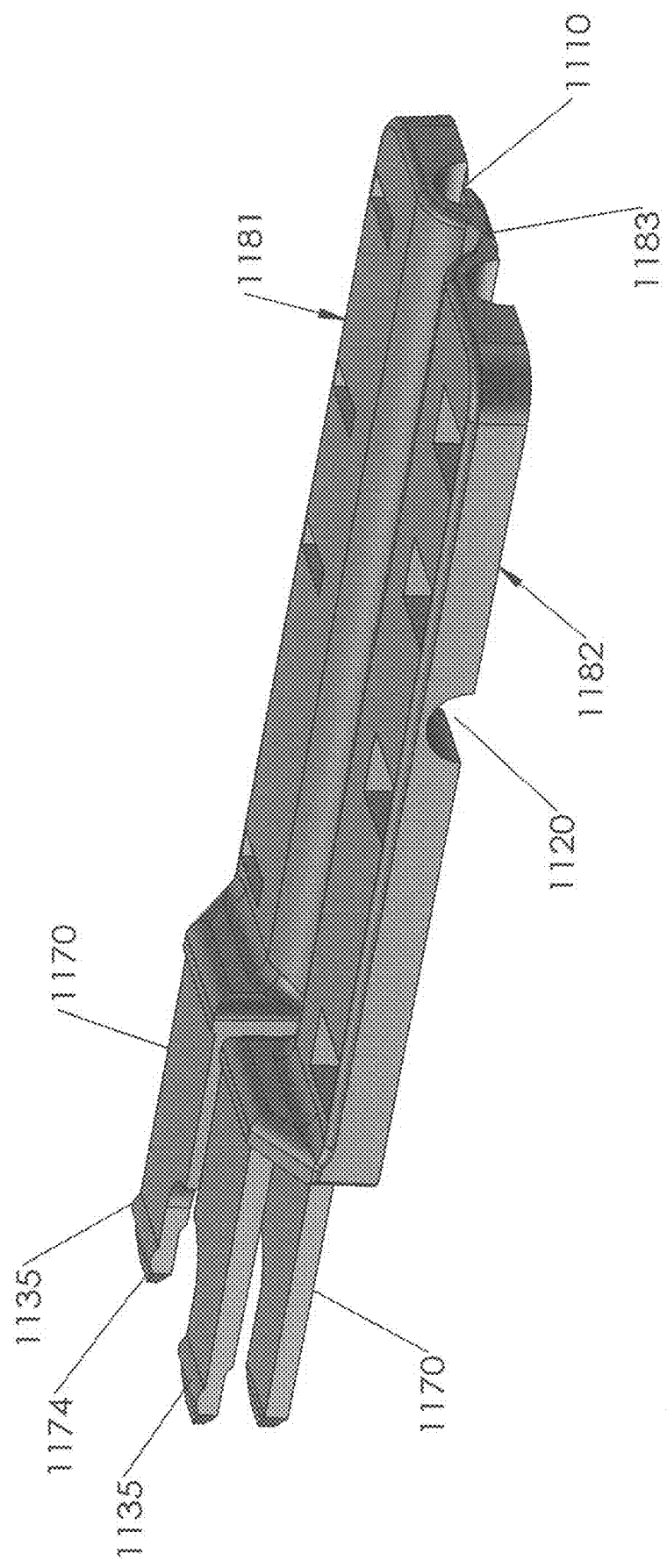

FIGS. 11A-11G show a close-up view of plastic securing member 1040 shown in FIG. 10A and at section "A" of FIG. 11. Plastic securing member 1040 includes a plurality of lower connectors 1170 and a body 1180. Each lower connector includes a lower connector stem 1171, a narrow portion 1172 connected to lower connector stem 1171 by a curved step 1173, and a tip 1174. The configuration of lower connector stem 1171, narrow portion 1172, curved step 1173, and tip 1174 allows lower connectors 1170 to fit into and engage stepped divider slot 998 in the preferred embodiment shown in the Figures such as FIG. 9B. Other configurations of lower connectors 1170 can easily be designed by those of skill in the art to engage other configurations of divider slots. As seen in FIG. 11B, each lower connector 1170 has a lower connector length 1175 and a lower connector width 1176 of lower connector stem 1171. Also, in the embodiment shown in FIG. 11B, each outermost lower connector 1170-1 of plastic securing member 1040 includes protrusion 1135 and a cut-out 1177. Protrusions 1135 and cut-outs 1177 combine to provide narrow portion 1172 with the same lower connector width 1176 as lower connector stem 1171. This configuration allows lower connectors 1170-1 to correctly fit into stepped divider slots 998 and allow protrusions 1135 to engage ribs 985. Tips 1174 allow for narrow portion 1172 to more easily engage the narrow portion of stepped divider slots 998. FIG. 11C shows securing member 1160. Securing member 1160 is designed and configured to insert into divider slots on a spacer (see, e.g., FIG. 12) to enhance the stability of cable divider 1100. The spacer will be comprised of a row of divider slots 213 having connecting pins 202 on each end to insert into roller support bar 112(see, e.g., FIG. 12), although the particular structure of the spacer can be designed to meet specific requirements by those of skill in the art. The spacer provides divider slots 213 as insertion points for securing member 1160 to thereby provide support for a longer divider such as cable divider 1100. Of course, securing member 1160 can be designed and configured to insert into the particular divider slots of the spacer as will be appreciated by those of skill in the art. In the preferred embodiment shown in FIGS. 11-11D, plastic securing member 1040 is of a living hinge design, i.e., capable of being opened and closed much more flexibly to create more elasticity to prevent damage from big swing or tilt as well as to meet with size requirement. FIG. 11D shows an open view of plastic securing member 1040 shown in FIG. 11B. in FIG. 11D, plastic securing member 1040 has a pair of engageable sides 1181, 1182 joined by a hinge 1183. Preferably, hinge 1183 includes a V-cut along the "inside" (i.e., the side of hinge 1183 where engageable sides 1181, 1182 meet) of midline of hinge 1183, preferably of about 90° degrees, i.e., 45-degrees on each engageable side 1181, 1182, for a best fit when engageable sides 1181, 1182 are closed.

Engageable sides 1181, 1182 include a plurality of engageable clips 1184, 1185 that engage each other when hinge is closed. Engageable clips 1184 can vary in size, number and position, and, although shown in FIG. 11D as four (4) male clips 1184 on engageable side 1182 and four (4) female clips 1185 shown on engageable side 1181, these can of course be varied. Plastic securing member 1040 also includes appropriately sized slots 1110, 1120, as described above. In the embodiment shown in the Figures, plastic securing member 1040 is molded from a polycarbonate material. Polycarbonate provides sufficient stiffness to plastic securing member 1040 and lower connectors 1170 so that plastic securing member can be inserted into stepped divider slots 998 yet is flexible so that cable dividers 1000, 1100 can be tilted away from vertical without pulling out of stepped divider slots 998. This allows cable dividers 1000 and 1100 to be tilted from 10°-45°, preferably 20°-45°, and more preferably 30°-45° away from vertical without pulling out of stepped divider slots 998. Although polycarbonate is used in the preferred embodiment shown in the Figures, other materials can be used that have an appropriate stiffness and flexibility. Such other materials include nylon, nylon with fiberglass, polycarbonate, polyesters, polypropylenes, polyethylenes, silicones and similar materials.

FIG. 12 shows a top front perspective view of another embodiment of gravity-fed roller shelf systems, comprising multiple individual roller tracks 100, wire dividers 1100, one front stop extrusion 1200 and one rear stop extrusion 1200. The embodiment shown in FIG. 12 is different from the embodiment shown in FIGS. 1 and 2. The individual roller track 100 comprises a roller track with landing zones 1210 in the front and rear, respectively (see, FIGS. 12A and 12D). Front and rear stop extrusions 1200 differ from stop extrusion 121 in that rather than having flange supports 620 and flanges 610, front and rear stop extrusions 1200 have a lock rod 1220 designed and configured to engage lock rod holders 1230 (see, FIGS. 12E and 12G) disposed on landing zones 1210 differ from landing zones 114. As is shown in FIG. 12G, there a pair of lock rod holder 1230 disposed on the bottom of landing zones 1210. Roller track 110 is connected to the front and rear stop extrusions 1200 by pressing the lock rod holders 1230 onto the front and rear lock rods 1220, respectively. There can be any number of lock rod holders 1230 on each of landing zones 1220. In addition, there is a slot block 1232 for accepting securing member 1160 on each medial vertical wire 1150 (see, FIG. 11C). In the embodiment shown in FIG. 12 there are two slot blots 1232 for applications having deep roller track 110 lengths, such as 36" (see, FIGS. 12B and 12C). FIG. 12H shows a partially exploded view where slot block 1232 has two connector pins 202 at each end to be inserted into roller supports 112. FIG. 12G shows section "G" of the front stop extrusion 1200 of FIG. 12F in detail. This embodiment is designed to install or take off any roller track to or from any position along the lock rods individually without remove other roller track(s).

The embodiments shown in the Figures easily adapt to different POGs (planograms), either as a continuous roller mat 100, or as a minimal number of roller tracks 110 with spacing between adjacent roller tracks 110 since each individual roller track 110 is removable and adjustable along the front/rear lock rods 1220. For example, the embodiment shown in FIGS. 12-12H is useful in those situations where the merchandise packaging is large enough to span more than on roller track 110 so that a continuous roller mat 100 is not necessary. This saves cost and installation time and provides flexibility to satisfying the POG.

The thickness of the roller tracks 110 from the top of rollers 111 to the bottom of roller track base 113 can be varied, such as from ⅜" to ⅞", depending upon application. This thickness range can meet most application requirements, such as ⅜" for in-cooler rack systems and dry gondola systems, or ¾" or ⅞" for heavy-duty roller tracks or roller mats. However, the locking mechanism of roller track heads 114 to roller tracks 110 allows for readjustment along the front and rear stops 120, 130. Since two roller tracks can be put together as shown in FIG. 4, roller mats with specified dimensions can be made using multiple, roller tracks. Consequently, the present design meets a "one-for-all" purpose using minimum tooling.

It should also be noted that the terms "first", "second", "third", "upper", "lower", "front", "rear" and the like may be used herein to modify various elements. These modifiers do not imply a spatial, sequential, or hierarchical order to the modified elements unless specifically stated. Also, it should be understood that where certain materials are mentioned as useful in making one or more of the elements of any embodiment of the present disclosure, it will be understood by those of skill in the art that the selection of material is a mere matter of design choice and/or of the necessary physical attributes of any particular element.

While the present disclosure has been described with reference to one or more exemplary embodiments, it will be understood by those skilled in the art that various changes may be made, and/or equivalents may be substituted, for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

All of the patents and patent publications referred to herein are Incorporated herein by reference as if fully set forth verbatim in this disclosure.

What is claimed is:

1. A cable divider comprising:
    at least a first longitudinal cable portion;
    a pair of vertical cable portions disposed at respective ends of the at first longitudinal cable;
    a securing member connected to each said vertical cable portion, said securing member comprising:
        an upper body portion which comprises two sides joined by a living hinge that open and close, and secures said vertical cable portion;
        and at least one lower connector is disposed on each side of the upper body portion, wherein each lower connector is configured to mate with respective divider slot of a roller track, and wherein said lower connectors hold said cable divider flexibly in place so that said cable divider may be tilted away from a vertical position and return to the vertical position.

2. The cable divider according to claim 1, further comprising at least one central vertical cable portion connected to the at least one longitudinal cable portion at a location between said pair of vertical cable portions, wherein the central vertical cable comprises an additional securing member designed and configured to insert into a divider slot on a spacer that connects two roller support bars of a roller track.

3. The cable divider according to claim 1, wherein the securing member is formed from a pair of engageable side portions joined by a living hinge, wherein the living hinge is along the inside midline of the vertical upper body portion which connects the pair of engageable side portions wherein the living hinge comprises a thin V-cut along the midline of the inside of the living hinge of about 90° degrees.

4. The cable divider according to claim 3, wherein each said engageable side portion includes at least one engageable clip that engages and locks together when said living hinge is in a closed position.

5. The cable divider according to claim 1, further comprising a second longitudinal cable portion disposed between and connected to each of said securing members connected to each said vertical cable portions, respectively.

6. The cable divider according to claim 1, wherein the upper body portion of said securing member further comprises an aperture configured to accept a portion of the vertical/longitudinal cable portion of the first longitudinal cable.

7. The cable divider according to claim 5, wherein the upper body portion of said securing member further comprises a second aperture configured to accept a second longitudinal cable.

8. The cable divider according to claim 1, wherein the at least one lower connector comprises a plurality of protrusions which removably connect said securing member into an underside of the divider slot.

9. The cable divider according to claim 2, wherein the living hinge is comprised of a thin flexible plastic portion.

10. A securing member for securing a cable divider to a divider slot, said securing member comprising:
    an upper body portion which comprises two sides that open and receives at least one cable of said cable divider; and
    at least one lower connector on each side of the upper body portion, wherein each lower connector is configured to be removably connected to a divider slot of a roller track, wherein said lower connectors hold said cable divider flexibly in place so that said cable divider may be tilted away from a vertical position and return to the vertical position.

11. The securing member according to claim 10, wherein the two sides of the securing member comprise a pair of engageable side portions joined by a living hinge.

12. The securing member according to claim 11, wherein each said engageable side portion includes at least one engageable clip that engages and locks together when said living hinge is in the closed position.

13. The securing member according to claim 10, wherein the upper body portion of said securing member further comprises an aperture configured to accept a vertical cable portion of a first longitudinal cable.

14. The securing member according to claim 10, wherein the upper body portion of said securing member further comprises a second aperture configured to accept a second longitudinal cable.

15. The securing member according to claim 10, wherein said connectors comprise a plurality of protrusions which removably connect said securing member into an underside of the divider slot.

16. The securing member according to claim 11, wherein the living hinge is comprised of a thin living plastic portion connecting the pair of engageable side portions.

17. The securing member according to claim 10, wherein the lower connectors are flexible and removeable when connected to divider slots while remaining secured within the divider slots so that said cable divider, connected to the upper portion of the securing member comprising the living hinge, may be tilted away between from about 10° up to about 45° from the vertical position and flexibly return to the vertical position.

\* \* \* \* \*